(12) United States Patent
Shen et al.

(10) Patent No.: US 12,308,135 B2
(45) Date of Patent: May 20, 2025

(54) ION TRAP SYSTEM

(71) Applicant: HUAWEI TECHNOLOGIES CO., LTD., Guangdong (CN)

(72) Inventors: Yangchao Shen, Shenzhen (CN); Zhengyu Li, Shenzhen (CN); Changzheng Su, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 902 days.

(21) Appl. No.: 17/359,909

(22) Filed: Jun. 28, 2021

(65) Prior Publication Data

US 2021/0327605 A1    Oct. 21, 2021

Related U.S. Application Data

(63) Continuation of application No. PCT/CN2019/124956, filed on Dec. 12, 2019.

(30) Foreign Application Priority Data

Dec. 28, 2018    (CN) .......................... 201811627330.8

(51) Int. Cl.
    *G21K 1/00*    (2006.01)
    *G02B 26/08*   (2006.01)
    *G02F 1/11*    (2006.01)
    *G02F 1/29*    (2006.01)

(52) U.S. Cl.
    CPC ......... *G21K 1/003* (2013.01); *G02B 26/0833* (2013.01); *G02F 1/11* (2013.01); *G02F 1/29* (2013.01)

(58) Field of Classification Search
    None
    See application file for complete search history.

(56) References Cited

U.S. PATENT DOCUMENTS

| | | | |
|---|---|---|---|
| 4,692,623 A * | 9/1987 | Roberts | G01K 17/003 |
| | | | 374/E17.002 |
| 2007/0040113 A1 | 2/2007 | Monroe et al. | |
| 2009/0084991 A1* | 4/2009 | Ichimura | G02F 1/113 |
| | | | 250/493.1 |
| 2016/0047643 A1 | 2/2016 | Yuan et al. | |

(Continued)

FOREIGN PATENT DOCUMENTS

| | | |
|---|---|---|
| CN | 102519928 A | 6/2012 |
| CN | 103454902 A | 12/2013 |

(Continued)

OTHER PUBLICATIONS

Debnath et al. ("Demonstration of a small programmable quantum computer with atomic qubits", Nature, vol. 536, No. 7614, Aug. 4, 2016 (Aug. 4, 2016), pp. 63-66, DOI: 10.1038/nature18648) in.*

(Continued)

*Primary Examiner* — Andrew Smyth

(57) ABSTRACT

An ion trap system includes a laser adjustment and control module configured to split a light beam into P first light beams and Q second light beams. N first light beams in the P first light beams are transmitted to N ions, respectively, and tM second light beams in the Q second light beams are transmitted to M monitoring units, respectively. The M monitoring units are configured to monitor the M second light beams, respectively, and obtain spatial information of the M second light beams. The system further includes a feedback control module configured to receive the spatial intensity distribution information of the M second light beams, determine N first control signals based on the spatial information of the M second light beams, and transmit the N first control signals to the laser adjustment and control module.

17 Claims, 14 Drawing Sheets

(56) References Cited

U.S. PATENT DOCUMENTS

| | | | |
|---|---|---|---|
| 2017/0294758 A1 | 10/2017 | Qiao | |
| 2018/0173027 A1* | 6/2018 | Morse | G02F 1/113 |
| 2018/0203265 A1* | 7/2018 | Morse | G02F 1/113 |

FOREIGN PATENT DOCUMENTS

| | | |
|---|---|---|
| CN | 103714878 A | 4/2014 |
| CN | 105829946 A | 8/2016 |
| CN | 106104747 A | 11/2016 |
| CN | 106338545 A | 1/2017 |
| CN | 106683976 A | 5/2017 |
| CN | 107077643 A | 8/2017 |
| CN | 109003875 A | 12/2018 |
| CN | 109661793 A | 4/2019 |
| WO | 2016068649 A1 | 5/2016 |
| WO | 2018183588 A1 | 10/2018 |

OTHER PUBLICATIONS

Ramil Nigmatullin et al., Minimally complex ion traps as modules for quantum communication and computing. New Journal of Physics, Oct. 19, 2016, 21 pages.

Zhan Mingsheng, Progress in laser manipulating single neutral atoms, Aug. 2015, with the English Translation Version, total 26 pages.

Jungsang Kim et al, Enabling Trapped Ion Quantum Computing with MEMS Technology, 2017 International Conference on Optical MEMS and Nanophotonics (OMN), Date of Conference: Aug. 13-17, 2017, Date Added to IEEE Xplore: Sep. 28, 2017, total 2 pages.

Amira M. Eltony et al, Technologies for trapped-ion quantum information systems, Progress toward scalability with hybrid systems, Received: Jan. 24, 2015/Accepted: Mar. 3, 2016/Published online: Mar. 21, 2016, Springer Science+Business Media New York 2016, total 33 pages.

Debnath et al: "Demonstration of a small programmable quantum computer with atomic qubits" 2016, 10 pages.

Knoernschild Caleb et al: "MEMS-based optical beam steering system for quantum information processing in (tvvo-dimensional atomic systems" Feb. 1, 2008, 4 pages.

Crain S et al: Individual addressing of trapped171Yb+ion qubits using a microelectromechanical systems-based beam steering system 2014, 4 pages.

H .C Nagerl et al:"Laser addressing of individual ions in a linear ion trap" Jul. 1999, 4 pages.

* cited by examiner

ION TRAP SYSTEM

CROSS-REFERENCE TO RELATED APPLICATIONS

This application is a continuation of International Application No. PCT/CN2019/124956, filed on Dec. 12, 2019, which claims priority to Chinese Patent Application No. 201811627330.8, filed on Dec. 28, 2018. The disclosures of the aforementioned applications are hereby incorporated by reference in their entirety.

TECHNICAL FIELD

This application relates to the field of quantum technologies, and in particular, to an ion trap system.

BACKGROUND

With development of information technologies, quantum state manipulation, in particular, quantum computing in the quantum state manipulation, attracts increasingly more attention. A basic principle of the quantum computing is to encode information through a quantum bit (for example, an ion). A status of a single quantum bit has two classical states: 0 and 1, and may further have a superposition state of 0 and 1. n quantum bits may be in a superposition state of $2^n$ quantum states at the same time. At present, the quantum computing has been continuously tried in terms of algorithm software and a hardware system.

In terms of the hardware system of the quantum computing, there are two main feasible solutions: an ion trap and a superconducting system, for example, a 5-qubit fully programmable ion trap system and a 20-qubit online superconducting quantum computing cloud service. The ion trap system includes an ion and an electrode structure confining an ion. The ion may be fixed in space in a specific structure by applying a specific electromagnetic field signal (also referred to as a confinement electromagnetic field signal) to the electrode structure and combining a Coulomb effect between ions. After that, quantum state manipulation of the ion can be implemented by emitting a laser light on the ion fixed in the specific structure.

In the prior art, long-distance transmission needs to be performed after a light beam is emitted by a laser to an ion, and the light beam is relatively easily affected by an external environment. Consequently, a transmission direction of the light beam changes, and the like. In addition, because a beam waist of the light beam focused on the ion is relatively small, the light beam transmitted to the ion cannot be aligned with the ion, and even a case in which the light beam and the ion are misplaced occurs. This affects fidelity of the quantum state manipulation.

SUMMARY

This application provides an ion trap system, to improve alignment between a light beam and a corresponding ion, thereby improving fidelity of quantum state manipulation performed on the ion.

This application provides an ion trap system, including a laser adjustment and control module, an ion trapping module, and a feedback control module. The ion trapping module includes N ions and M monitoring units disposed in a vacuum system. The laser adjustment and control module is configured to: split a light beam from a laser into P first light beams and Q second light beams, transmit N first light beams in the P first light beams to N ions, respectively, and transmit M second light beams in the Q second light beams to M monitoring units, respectively. The M monitoring units are configured to monitor the M second light beams, respectively, and obtain spatial intensity distribution information of the M second light beams, respectively. The feedback control module is configured to: receive the spatial intensity distribution information of the M second light beams, determine N first control signals based on the spatial intensity distribution information of the M second light beams, and transmit the N first control signals to the laser adjustment and control module. The N first control signals are in a one-to-one correspondence with the N first light beams, and the first control signal is used to control the laser adjustment and control module to align the corresponding first light beam with the ion.

Second shift information is used to indicate a degree to which the corresponding second light beam shifts from an initialization position. The spatial intensity distribution information corresponding to the second light beam is used to indicate a relationship between a light intensity and a spatial location of the second light beam on the corresponding monitoring unit. The N first light beams are in a one-to-one correspondence with the N ions, and the M second light beams are in a one-to-one correspondence with the M monitoring units. One first light beam is used to perform quantum state manipulation on one ion, and one second light beam is used to determine one piece of second shift information. M pieces of spatial intensity distribution information may be obtained through the M second light beams, and the M pieces of spatial intensity distribution information are in a one-to-one correspondence with M pieces of second shift information. N pieces of first shift information are in a one-to-one correspondence with the N first control signals. P is an integer not less than N, and Q is an integer not less than M. N is a positive integer, and M is an integer greater than one.

It may be determined from FIG. 2 that, the N first control signals may be determined based on the spatial intensity distribution information of the M second light beams. The laser adjustment and control module adjusts a transmission direction of the corresponding first light beam based on the first control signal, to enable the corresponding first light beam to be aligned with the ion. In addition, because the N first control signals are in the one-to-one correspondence with the N first light beams, a transmission direction of each of the N first light beams may be adjusted, to enable the N first light beams to be aligned with the N ions in a one-to-one manner. In this way, alignment between the first light beam and the ion is improved, and this helps implement the quantum state manipulation accurately performed by the first light beam on the corresponding ion.

DESCRIPTION OF EMBODIMENTS

Figure 1A:
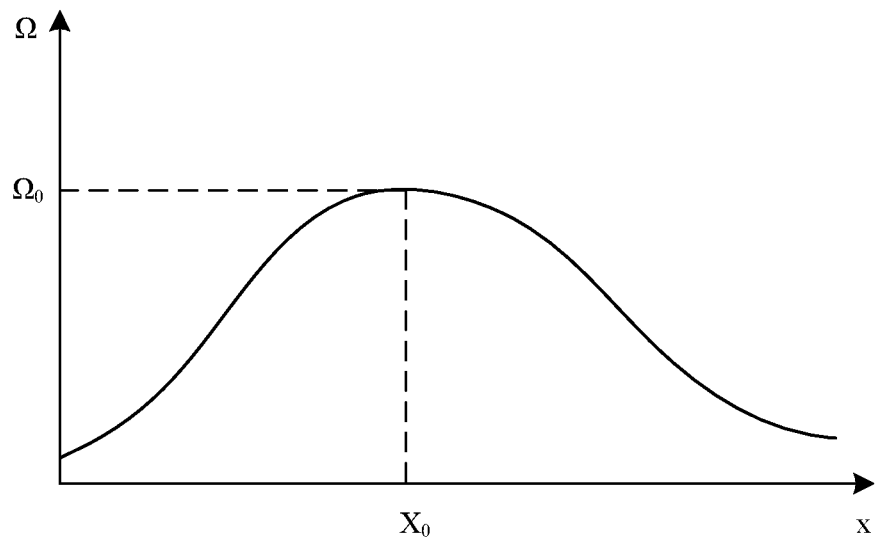
FIG. 1a is a schematic diagram of a relationship between a Rabi intensity and a light beam coordinate according to this application.

To make the objectives, technical solutions, and advantages of this application clearer, the following further describes this application in detail with reference to the accompanying drawings.

For ease of understanding, basic concepts included in this application are described below.

1. Ion Trap

An ion trap is a device that uses an electric field or a magnetic field to capture and confine ions (charged atoms or molecules) within a given range. The ions are confined in a vacuum and do not contact a surface of the device. A "Paul ion trap" (also referred to as a quadrupole ion trap) is widely used. The quadrupole ion trap can be implemented by adding a front-end cover and a rear-end cover to a four-rod structure. The ions are focused on a line, to increase an ion storage capacity, and help avoid a space charge effect and simplify an electrode structure. The quadrupole ion trap is also referred to as a linear ion trap.

2. ABCD Matrix

An ABCD matrix is also referred to as a light transmission matrix, a light beam transmission matrix, or a light beam transmission ABCD matrix. The ABCD matrix is a 2*2 matrix, and is proposed to calculate transmission of a light beam whose horizontal shift is r and whose shift angle is $\theta$. The horizontal shift r and the shift angle $\theta$ are also referred to as coordinates of a light beam. The ABCD matrix may describe a function of an optical device in light beam transmission. It may also be understood that the ABCD matrix is an intrinsic quantity of the optical device. For example, when a transmission distance of the light beam in free space is d, the ABCD matrix is $$\begin{pmatrix} 1 & d \\ 0 & 1 \end{pmatrix}.$$

For another example, an ABCD matrix of a lens whose focal length is f is $$\begin{pmatrix} 1 & 0 \\ -1/f & 1 \end{pmatrix}.$$

For another example, after being transmitted in the free space for a distance $d_1$, the light beam passes through the lens whose focal length is f, and then is transmitted in the free space for a distance $d_2$. In this way, a corresponding matrix ABCD is $$\begin{pmatrix} 1 & d_2 \\ 0 & 1 \end{pmatrix} \begin{pmatrix} 1 & 0 \\ -1/f & 1 \end{pmatrix} \begin{pmatrix} 1 & d_1 \\ 0 & 1 \end{pmatrix}.$$

When an included angle between a transmission direction of the light beam and an optical axis is relatively small, changes of the horizontal shift r and the shift angle $\theta$ that are of the light beam after passing through the optical device may be calculated through the ABCD matrix. Specifically, before and after the light beam passes through the optical device, an absolute value of change between the horizontal shift r and the shift angle $\theta$ may be calculated through the following formula 1.

$$\begin{pmatrix} r_0^{(i)} \\ \theta_0^{(i)} \end{pmatrix} = \begin{pmatrix} A^{(i)} & B^{(i)} \\ C^{(i)} & D^{(i)} \end{pmatrix} \begin{pmatrix} r_1^{(i)} \\ \theta_1^{(i)} \end{pmatrix} \qquad \text{Formula 1}$$

$$\begin{pmatrix} r_0^{(i)} \\ \theta_0^{(i)} \end{pmatrix}$$

represents coordinates of an $i^{th}$ light beam after the $i^{th}$ light beam passes through the optical device. To be specific, $r_0^{(i)}$ represents a horizontal shift of the $i^{th}$ light beam after the $i^{th}$ light beam passes through the optical device, and $\theta_0^{(i)}$ represents a shift angle of the $i^{th}$ light beam after the $i^{th}$ light beam passes through the optical device.

$$\begin{pmatrix} r_1^{(i)} \\ \theta_1^{(i)} \end{pmatrix}$$

represents coordinates of the $i^{th}$ light beam before the $i^{th}$ light beam passes through the optical device. To be specific, $r_1^{(i)}$ represents a horizontal shift of the $i^{th}$ light beam before the $i^{th}$ light beam passes through the optical device, and $\theta_1^{(i)}$ represents a shift angle of the $i^{th}$ light beam before the $i^{th}$ light beam passes through the optical device.

3. Beam Waist

A beam waist indicates a position with a smallest beam radius. For example, a beam waist of a laser light beam is a place with a smallest beam radius in a beam transmission direction, and the beam radius of the place may be referred to as a beam waist radius. Usually, a smaller beam waist radius may be obtained by a lens with a larger numerical aperture through focusing.

4. Rabi Oscillation Scanning

Rabi oscillation scanning: Different oscillation signals are obtained by loading light beams with different lengths to an ion; an oscillation period T is obtained by fitting different oscillation signals corresponding to different lengths; and a Rabi intensity at a location may be determined based on a relationship $\Omega=1/T$ between the Rabi intensity and the oscillation period. Different Rabi intensities $\Omega$ may be obtained by changing a position illuminated by the light beam on the ion. That is, when the light beam illuminates on different positions on the ion, the obtained Rabi intensities $\Omega$ are also different. When the light beam is aligned with the ion, a measured Rabi intensity is the greatest. FIG. 1a is a schematic diagram of a relationship between a Rabi intensity and a light beam coordinate. As shown in FIG. 1a, when the light beam coordinate is $X_0$, a corresponding Rabi intensity is the largest, and is $\Omega_0$. This indicates that when the light beam coordinate is $X_0$, a light beam is aligned with an illuminated ion.

5. One-to-One Correspondence

Figure 1B:
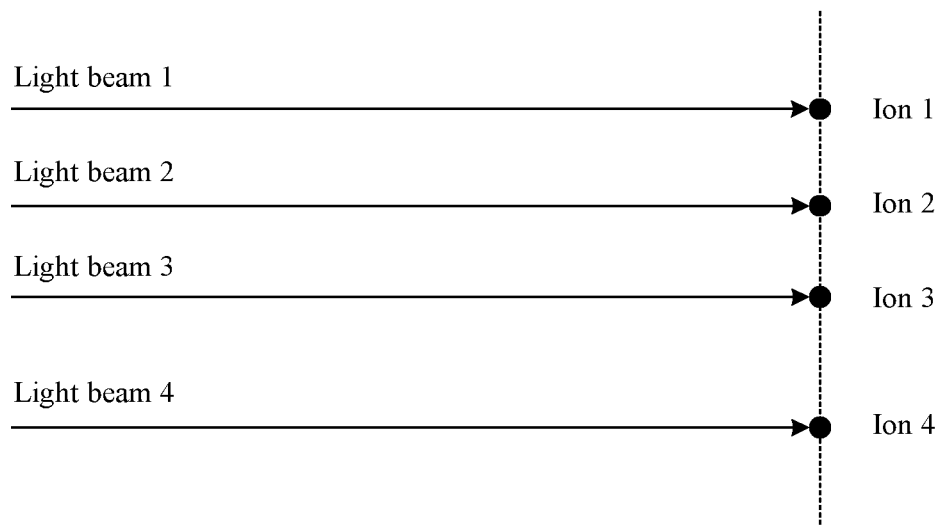
FIG. 1b is a schematic diagram of a one-to-one correspondence between a light beam and an ion according to this application.

One-to-one correspondence is a one-to-one correspondence between elements in two sets. That is, each element in one set is exactly paired with each element in another set, and there is no unpaired element. In this application, the set may be N first light beams, M second light beams, N pieces of first shift information, M pieces of second shift information, M pieces of spatial intensity distribution information, N first feedback signals, N first control signals, M first feedback signals, M first control signal, or the like. FIG. 1b is an example of a schematic structural diagram of a one-to-one correspondence between a light beam and an ion. As shown in FIG. 1b, four light beams and four ions are included, and the four light beams are in a one-to-one correspondence with the four ions. That is, one light beam is corresponding to one ion, and there is no non-corresponding light beam or ion.

6. Others

The term "and/or" is used to describe an association relationship for describing associated objects, and indicates that three relationships may exist. For example, "A and/or B" may represent the following three cases: Only A exists, only B exists, and both A and B exist, where A and B may be singular or plural. The character "/" generally indicates an "or" relationship between the associated objects.

The terms "first", "second", and the like are intended to distinguish between similar objects but do not necessarily indicate a specific order or sequence. In addition, the terms "include", "have", and any variant thereof are intended to cover a non-exclusive inclusion, for example, a series of modules or units. A system, product, or device is not necessarily limited to those modules or units that are clearly listed, but may include other modules or units that are not clearly listed or inherent to these systems, modules, or units.

As described in the background, for a current ion trap system, long-distance transmission needs to be performed after a light beam is emitted by a laser to an ion, and the light beam is relatively easily affected by an external environment. Consequently, a transmission direction of the light beam changes, and the like. In addition, because a beam waist of the light beam focused on the ion is relatively small, a problem in which the light beam transmitted to the ion cannot be aligned with the ion, and even the light beam and the ion are misplaced occurs. Therefore, the ion trap system in the prior art affects fidelity of quantum state manipulation.

To resolve this problem, this application provides an ion trap system. The ion trap system determines second shift information of a second light beam by adding the second light beam used to determine the shift information of the light beam, and determines first shift information of a first light beam based on the second shift information. A feedback control module outputs a first control signal based on the first shift information, and a laser adjustment and control module adjusts a transmission direction of the first light beam under control of the first control signal, to enable the first light beam transmitted to an ion to be aligned with the corresponding ion.

The following describes the ion trap system provided in this application in detail with reference to FIG. 2 to FIG. 6.

Figure 2:
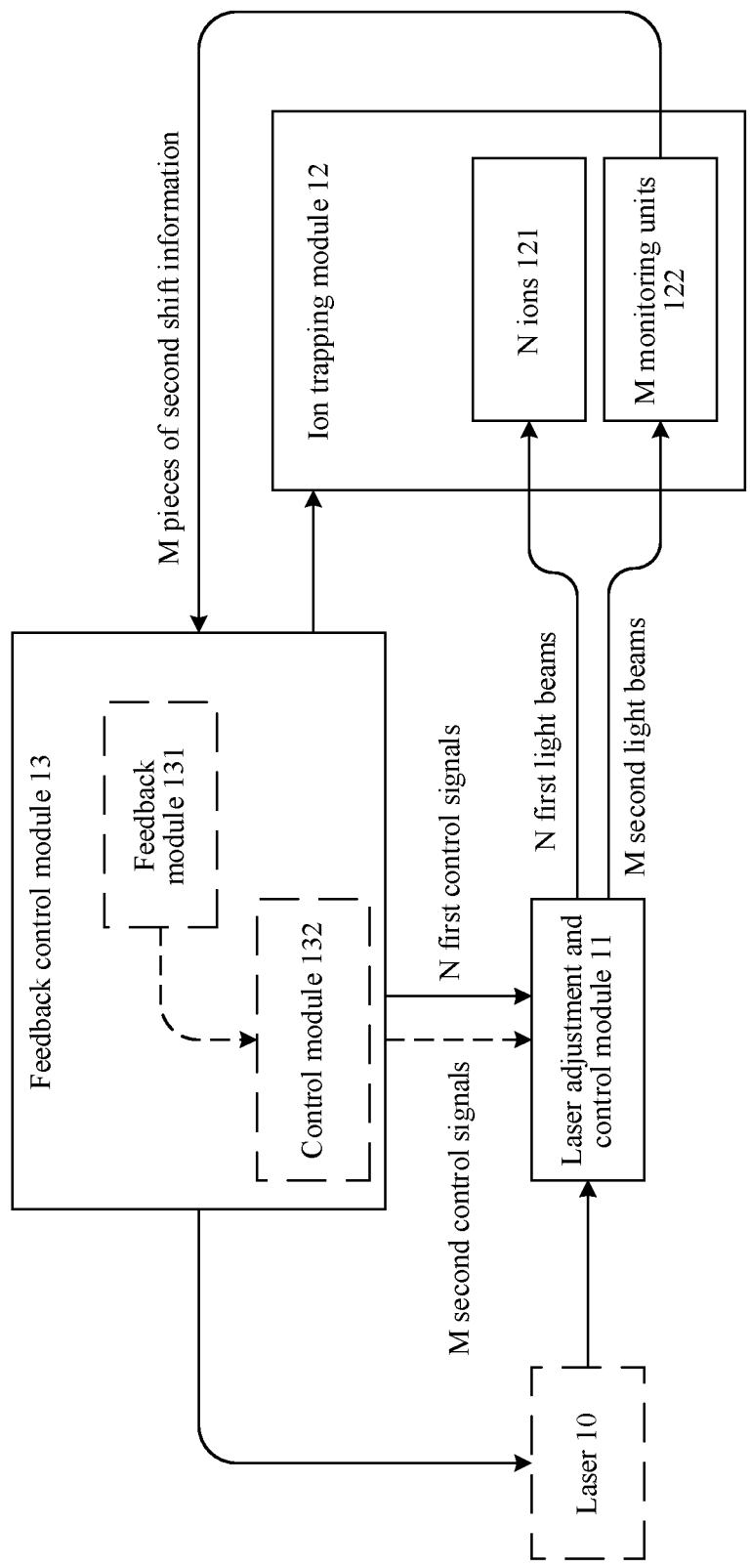
FIG. 2 is a schematic diagram of an architecture of an ion trap system according to this application.

FIG. 2 is a schematic diagram of an architecture of an ion trap system according to this application. The ion trap system includes a laser adjustment and control module 11, an ion trapping module 12, and a feedback control module 13. The ion trapping module 12 includes N ions 121 and M monitoring units 122 that are disposed in a vacuum system. The laser adjustment and control module 11 is configured to: split a light beam from a laser into P first light beams and Q second light beams, transmit N first light beams in the P first light beams to the N ions, respectively, and transmit M second light beams in the Q second light beams to the M monitoring units, respectively. The M monitoring units 122 are configured to monitor the M second light beams, respectively, and obtain spatial intensity distribution information of the M second light beams, respectively. The second light beam is used to determine second shift information, and the second shift information is used to indicate a degree to which the corresponding second light beam shifts from an initialization position. The spatial intensity distribution information corresponding to the second light beam is used to indicate a relationship between a light intensity and a spatial location of the second light beam on the corresponding monitoring unit. The feedback control module 13 is configured to: receive the spatial intensity distribution information corresponding to the M second light beams, determine N first control signals based on the spatial intensity distribution information corresponding to the M second light beams, and transmit the N first control signals to the laser adjustment and control module. The first control signal is used to control the laser adjustment and control module to align the corresponding first light beam with the ion.

N is a positive integer, and M is an integer greater than one. P is an integer not less than N, and Q is an integer not less than M. One first light beam is used to perform quantum state manipulation on one ion, and the N first light beams are in a one-to-one correspondence with the N ions. One first control signal is corresponding to one first light beam, and N first light beams are in a one-to-one correspondence with the N first control signals. The M second light beams are in a one-to-one correspondence with the M monitoring units. One second light beam is corresponding to one piece of spatial intensity distribution information, and the M second light beams may be used to obtain M pieces of spatial intensity distribution information. One piece of spatial intensity distribution information may be used to determine one piece of second shift information, and the M pieces of spatial intensity distribution information may be used to obtain M pieces of second shift information.

It may be determined from FIG. 2 that, the N first control signals may be determined based on the spatial intensity distribution information of the M second light beams and the spatial intensity distribution information obtained by monitoring the M second light beams by the M monitoring units. The laser adjustment and control module adjusts a transmission direction of the corresponding first light beam based on the first control signal, to enable the corresponding first light beam to be aligned with the ion. In addition, because the N first control signals are in the one-to-one correspondence with the N first light beams, a transmission direction of each of the N first light beams may be adjusted, to enable the N first light beams to be aligned with the N ions in a one-to-one manner. In this way, alignment between the first light beam and the ion is improved, and this helps implement the quantum state manipulation accurately performed by the first light beam on the corresponding ion.

In addition, the second light beam is monitored, and the quantum state manipulation is performed by the first light beam on the corresponding ion. In this way, the N first light beams can be aligned with the N ions in the one-to-one manner without the quantum state manipulation performed by the first light beam on the ion being damaged. Further, the N first light beams are in the one-to-one correspondence with the N ions, so that the quantum state manipulation can be performed on a plurality of ions at the same time. In addition, one first light beam is corresponding to one ion, and a problem that the first light beam switches from one ion to another ion does not occur. This helps avoid a problem that the ions affect each other when the quantum state manipulation is performed.

It should be noted that the first light beam in FIG. 2 may also be referred to as a manipulation light beam, and the second light beam may also be referred to as a monitoring light beam. In a possible implementation, the first light beam and the second light beam may be separated by an optical device from a same light beam emitted by the laser, and only have different functions. A distance between the first light beam and the second light beam is relatively small, and the first light beam and the second light beam are transmitted together to the ion trapping module. In addition, the first light beam and the second light beam are transmitted to the ion trapping module through a same module (or a same optical device). Therefore, it may be considered that the first light beam and the second light beam are basically equally affected by an external environment (for example, mechanical vibration, airflow disturbance, and the like) when being transmitted to the laser adjustment and control module.

It should be further noted that, the ion trap system shown in FIG. 2 is usually placed on an optical vibration isolation platform, and undergoes airflow protection. The external environment (for example, the mechanical vibration, the airflow disturbance, and the like) that affects the ion trap system is usually at an Hz magnitude, and a conversion period is of hundreds of milliseconds. A response time period of the feedback control module 13 may be within milliseconds, that is, the response time period of the feedback control module is less a time period affected by the environment. Therefore, the ion trap system shown in FIG. 2 may be used to ensure high fidelity of the quantum state manipulation performed on the ion.

Further, as shown in FIG. 2, the feedback control module 13 in this application may include a feedback module 131 and a control module 132. In a possible implementation, the feedback module 131 may be a processor, and the control module 132 may be a controller. In another possible implementation, both the feedback module 131 and the control module 132 may be processors. In yet another possible implementation, the feedback module 131 may include a detector signal collection circuit, a processing and analysis circuit, a feedback signal output circuit, and the like, and may further store a specific feedback algorithm. The control module 132 may include a high-speed electrical signal control circuit and a low-speed electrical signal control circuit, and may output a control signal to adjust and control the laser adjustment and control module 11.

The following separately describes the functional modules shown in FIG. 2, to provide an example of a specific implementation.

1. Feedback Control Module 13

In a possible implementation, the feedback control module 13 may include the control module 132 and the feedback module 131. The control module 132 and the feedback module 131 may be separately configured to perform some functions of the feedback control module 13. The following provides two implementations as examples for description.

Implementation 1: The Feedback Module 131 Determines First Shift Information.

The feedback module 131 is configured to: receive the spatial intensity distribution information of the M second light beams, and determine the second shift information based on the spatial intensity distribution information of the second light beams to obtain the M pieces of second shift information; and determine the first shift information of the N first light beams based on the M pieces of second shift information, determine a first feedback signal based on the first shift information of the first light beam to obtain N first feedback signals, and transmit the N first feedback signals to the control module 132. The first shift information is used to indicate a degree to which the corresponding first light beam shifts from an initialization position. The control module 132 is configured to: determine the first control signal based on the first feedback signal to obtain the N first control signals, and transmit the N first control signals to the laser adjustment and control module 11.

One piece of first shift information may be determined based on the M pieces of second shift information. For each first light beam, the first shift information of the first light beam may be determined based on the M pieces of second shift information to obtain N pieces of first shift information, namely, the N first light beams are in a one-to-one correspondence with the N pieces of first shift information. The N pieces of first shift information are in a one-to-one correspondence with the N first feedback signals, namely, one piece of first shift information is corresponding to one first feedback signal. The N first feedback signals are in a one-to-one correspondence with the N first control signals, namely, one first feedback signal is corresponding to one first control signal.

In a possible implementation, the monitoring unit 122 may monitor the M second light beams at a first time point to obtain first spatial intensity distribution information of the M second light beams, may monitor the M second light beams at a second time point to obtain second spatial intensity distribution information of the M second light beams, and may send the first spatial intensity distribution information of the M second light beams and the second spatial intensity distribution information of the M second light beams to the feedback module 131. The feedback module 131 is configured to: receive the first spatial intensity distribution information of the M second light beams and the second spatial intensity distribution information of the M second light beams; determine the second shift information of the second light beam based on the first spatial intensity distribution information of the second light beam and the second spatial intensity distribution information of the second light beam to obtain the M pieces of second shift information; and determine the first shift information of the N first light beams based on the M pieces of second shift information and a light beam transmission ABCD matrix between the laser adjustment and control module 11 and the ion trapping module 12 to obtain the N pieces of first shift information.

The M second light beams are in a one-to-one correspondence with the M pieces of first spatial intensity distribution information, namely, one second light beam is corresponding to one piece of first spatial intensity distribution information. The M second light beams are in a one-to-one correspondence with the M pieces of second spatial intensity distribution information, namely, one second light beam is corresponding to one piece of second spatial intensity distribution information. For one second light beam, the corresponding first spatial intensity distribution information and the corresponding second spatial intensity distribution information may be used to determine the second shift information of the second light beam. The M second light beams may be used to determine the M pieces of second shift information. One piece of first shift information may be obtained for one first light beam, and the N first light beams are in the one-to-one correspondence with the N pieces of first shift information. It may also be understood that, for an $i^{th}$ second light beam of the M second light beams, second shift information of the $i^{th}$ second light beam is determined based on corresponding first spatial intensity distribution information and corresponding second spatial intensity distribution information that are corresponding to the $i^{th}$ second light beam, where i ranges from 1 to M.

Implementation 2: The Control Module 132 Determines the First Shift Information.

The feedback module 131 is configured to: receive the spatial intensity distribution information of the M second light beams, determine the second shift information based on the spatial intensity distribution information of the second light beams to obtain the M pieces of second shift information, and transmit the M pieces of second shift information to the control module 132. The control module 132 is configured to: determine the first shift information of the N first light beams based on the M pieces of second shift information, determine the first control signal based on the first shift information of the first light beam to obtain the N first control signals, and transmit the N first control signals to the laser adjustment and control module.

The N pieces of first shift information are in a one-to-one correspondence with the N first control signals, namely, one piece of first shift information is corresponding to one first control signal. One piece of first shift information may be determined based on the M pieces of second shift information. For each first light beam, the first shift information of the first light beam may be determined based on the M pieces of second shift information to obtain the N pieces of first shift information, namely, the N first light beams are in a one-to-one correspondence with the N pieces of first shift information.

In a possible implementation, the monitoring unit 122 may monitor the M second light beams at a first time point to obtain first spatial intensity distribution information of the M second light beams, may monitor the M second light beams at a second time point to obtain second spatial intensity distribution information of the M second light beams, and may transmit the first spatial intensity distribution information of the M second light beams and the second spatial intensity distribution information of the M second light beams to the feedback module 131. The feedback module 131 is configured to: receive the first spatial intensity distribution information of the M second light beams and the second spatial intensity distribution information of the M second light beams; determine the second shift information of the second light beam based on the first spatial intensity distribution information of the second light beam and the second spatial intensity distribution information of the second light beam to obtain the M pieces of second shift information; and transmit the determined M pieces of second shift information to the control module 132. The control module 132 is configured to determine the first shift information of the N first light beams based on the M pieces of second shift information and a light beam transmission ABCD matrix between the laser adjustment and control module and the ion trapping module to obtain the N pieces of first shift information.

In this implementation, for a correspondence between the M pieces of second shift information and the N pieces of first shift information, refer to the description in the foregoing implementation 1. Details are not described herein again.

For the implementation 1 and the implementation 2 of the feedback control module 13, in a possible implementation, ABCD matrices between the laser adjustment and control module 11 and each of the N ions may be strictly calculated (detailed description is provided below with reference to a specific hardware structure). The calculated N ABCD matrices may be all different, or may be partially the same or all the same.

In a possible implementation, that one ion is corresponding to one light beam transmission ABCD matrix may also be understood as that the N ions are in a one-to-one correspondence with the N light beam transmission ABCD matrices. In another possible implementation, the N light beam transmission ABCD matrices corresponding to the N ions are the same. For example, in a scenario in which the ions are in one-dimensional arrangement, and distances from the N first light beams to the N ions and optical devices that the N first light beams pass through are the same, the light beam transmission ABCD matrices respectively corresponding to the N ions may be the same.

The first shift information may be further determined through a value difference method or a machine learning method.

The M second light beams may be aligned with the M monitoring units 122 in the one-to-one manner to improve the alignment between the first light beam and the corresponding ion. In a possible implementation, the feedback module 131 is further configured to: determine a second feedback signal based on the second shift information to obtain M second feedback signals, and transmit the M second feedback signals to the control module 132. The control module 132 is further configured to: determine a second control signal based on the second feedback signal to obtain M second control signals, and transmit the M second control signals to the laser adjustment and control module 11. The M second control signals are in a one-to-one correspondence with the M second light beams, and the second control signal is used to control the laser adjustment and control module to align the corresponding second light beam with the monitoring unit. In this way, the M second light beams can be aligned with the M monitoring units 122 in the one-to-one manner.

One piece of second shift information is corresponding to one second feedback signal, namely, the M pieces of second shift information are in a one-to-one correspondence with the M second feedback signals. One second feedback signal is corresponding to one second control signal, and the M second feedback signals are in a one-to-one correspondence with the M second control signals. One second control signal is corresponding to one second light beam, and the M second control signals are in the one-to-one correspondence with the M second light beams.

In another possible implementation, the control module 132 is further configured to: determine a second control signal based on the second shift information to obtain M second control signals, and transmit the M second control signals to the laser adjustment and control module 11. The second control signal is used to control the laser adjustment and control module 11 to align the corresponding second light beam with the monitoring unit 122. In this way, the M second light beams may also be aligned with the M monitoring units 122 in the one-to-one manner.

One piece of second shift information is corresponding to one second control signal, and the M pieces of second shift information are in a one-to-one correspondence with the M second control signals. One second control signal is corresponding to one second light beam, and the M second control signals are in a one-to-one correspondence with the M second light beams.

In this application, the laser adjustment and control module adjusts and controls, by using the first control signal, the first light beam to be aligned with the corresponding ion. The laser adjustment and control module adjusts and controls, by using the second control signal, the second light beam to be aligned with the corresponding monitoring unit. Namely, the laser adjustment and control module can separately and independently adjust and control the first light beam and the second light beam.

2. Ion Trapping Module 12

It should be noted that, in the ion trapping module 12, the ion 121 needs to be isolated from the external environment, to prevent another particle from colliding with the ion 121. This avoids a case in which a quantum state of the ion 121 is damaged or a loss of the ion 121 is caused. Therefore, the vacuum system is a prerequisite for the quantum state manipulation performed on the ion 121. Optionally, the vacuum system may alternately be an ultra-high vacuum system. Further, the ion trapping module 12 may further include a control circuit that generates a specific electromagnetic field and that is configured to confine the N ions 121 in the vacuum system. In this application, an ion trap in the ion trap trapping module may be a four-rod trap, a blade trap, a surface trap, or the like. This is not limited in this application.

The ions in the ion trapping module 12 may be in one-dimensional arrangement, in two-dimensional arrangement, or in three-dimensional arrangement. This is not limited in this application. For ease of understanding, the following provides two possible structures of the ion trapping module 12.

Structure 1: The Ion Trapping Module when the Ions are in the One-Dimensional Arrangement.

Figure 3A:
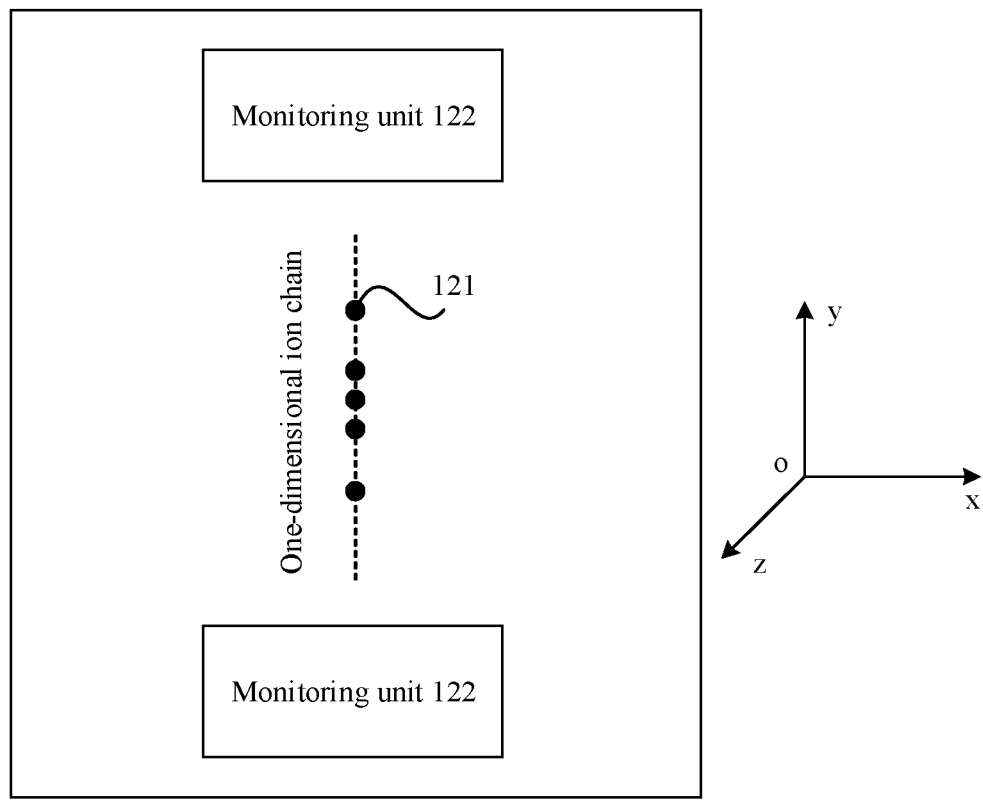
FIG. 3a is a schematic structural diagram of an ion trapping module according to this application.

Based on the foregoing content, FIG. 3a is a schematic structural diagram of an ion trapping module according to this application. The ion trapping module includes the N ions 121 and the M monitoring units 122 that are disposed in the vacuum system. In FIG. 3a, an example in which both the N ions 121 and the M monitoring units 122 are located on a xoy plane and M is equal to 2 is used for description.

As shown in FIG. 3a, the N ions may form a one-dimensional ion chain, and intervals between two adjacent ions on the one-dimensional ion chain may be equal or unequal. The two monitoring units 122 may be disposed on top and bottom ends of the one-dimensional ion chain, disposed on left and right sides of the one-dimensional ion chain, or disposed at any other locations. This is not limited in this application. In FIG. 3a, an example in which the monitoring units 122 are disposed on the top and bottom ends of the one-dimensional ion chain is used. Optionally, the monitoring unit 122 may be equivalent to the ion 121.

Structure 2: The Ion Trapping Module when the Ions are in the Two-Dimensional Arrangement.

Figure 3B:
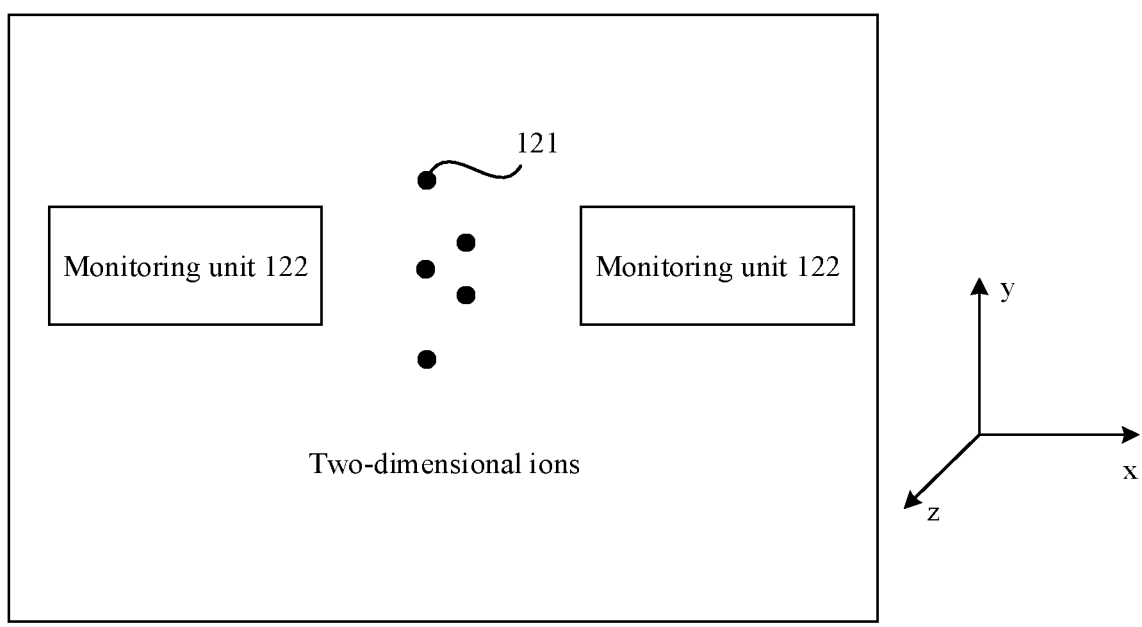
FIG. 3b is a schematic structural diagram of another ion trapping module according to this application.

Based on the foregoing content, FIG. 3b is a schematic structural diagram of another ion trapping module according to this application. The ion trapping module also includes the N ions 121 and the M monitoring units 122 that are disposed in the vacuum system. In FIG. 3b, an example in which both the N ions 121 and the M monitoring units 122 are located on a xoy plane and M is equal to 2 is used for description. The N ions in the ion trapping module 12 are in the two-dimensional arrangement, and distances between adjacent ions are unequal. In FIG. 3b, an example in which the monitoring units 122 are disposed on left and right ends of the N ions is used. The monitoring units 122 may also be disposed at top and bottom ends of the N ions, or disposed at other locations. This is not limited in this application either.

Further, there may be a plurality of monitoring units 122 in the ion trapping modules shown in FIG. 3a and FIG. 3b. For example, there are four monitoring units 122 that may be disposed around a circle of the N ions 121. When there are a larger quantity of monitoring units 122, a signal-to-noise ratio of the second light beam may be improved. Therefore, the determined second shift information is more accurate, and the first shift information determined based on the second shift information is more accurate. In this way, a more accurate quantum state manipulation can be performed on the ions. Optionally, the monitoring unit 122 needs to be as close to the ion 121 as possible, to more accurately monitor an environment around the ion.

In a possible implementation, the monitoring unit 122 may be a detector, for example, a photosensitive array detector, a photoelectric detector, a PD, or a charge-coupled device (CCD). It should be noted that sizes of beam waists of the first light beam and the second light beam are about 2 micrometers. To accurately monitor the second shift information of the second light beam, a minimum pixel of the detector needs to meet the following requirement: The detector can identify at least a change that is of about 2 micrometers and that occurs on the second light beam. Currently, the minimum pixel size of the detector is 50 nanometers. In this way, the detector can accurately monitor the second shift information of the second light beam.

Figure 3C:
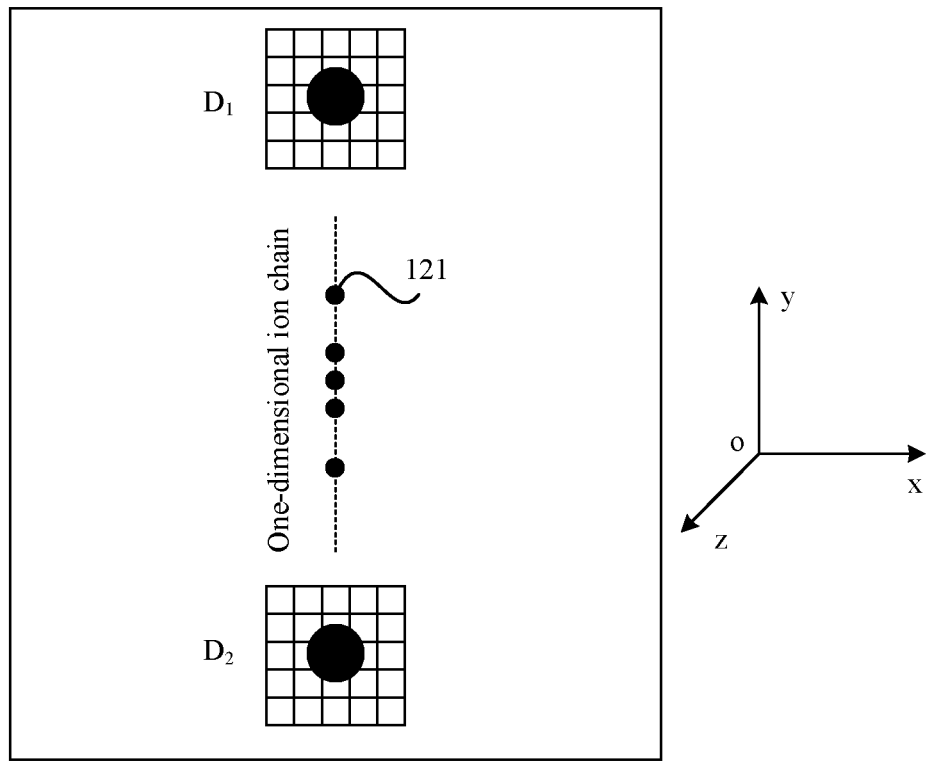
FIG. 3c is a schematic structural diagram of another ion trapping module according to this application.
Figure 3D:
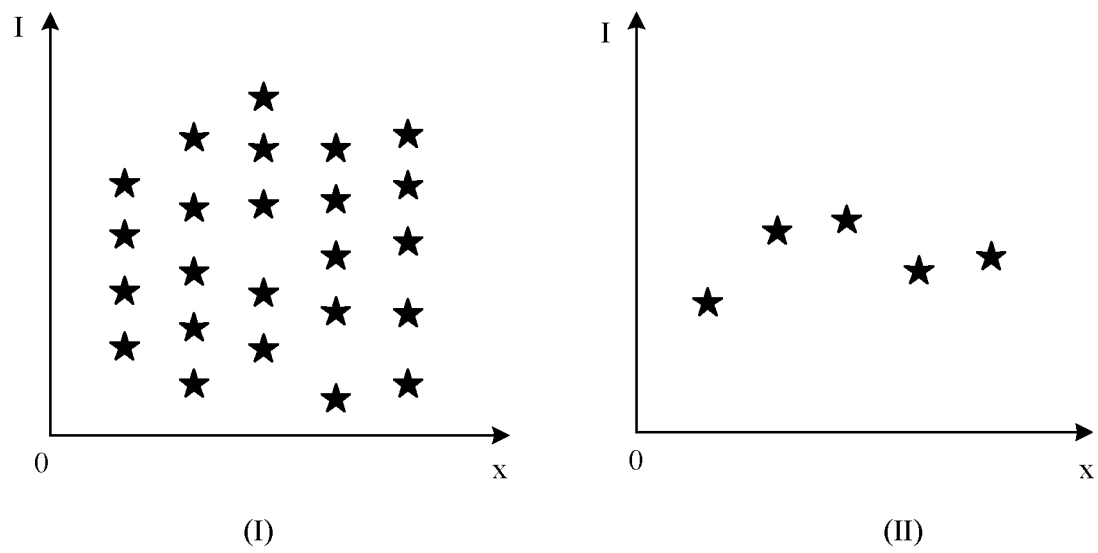
FIG. 3d is a schematic diagram of a relationship between a light intensity and a spatial location according to this application.

Based on the ion trapping modules shown in FIG. 3a and FIG. 3b, that the monitoring units 122 are the photosensitive array detector and a quadrant photoelectric detector respectively is used as an example, and a process in which the monitoring unit 122 determines the second shift information of the second light beam is described in detail in the following two cases:

Case 1: The two monitoring units 122 may be a photosensitive array detector $D_1$ and a photosensitive array detector $D_2$. FIG. 3c is a schematic structural diagram of another ion trapping module according to this application. The ion trapping module includes the photosensitive array detector $D_1$, the photosensitive array detector $D_2$, and the N ions. It is assumed that both the photosensitive array detector $D_1$ and the photosensitive array detector $D_2$ include 5*5 photosensitive units.

In the case 1, the photosensitive array detector $D_1$ and the photosensitive array detector $D_2$ may be same photosensitive array detectors, and a difference is that the photosensitive array detector $D_1$ and the photosensitive array detector $D_2$ are placed at different positions. A process in which the photosensitive array detector $D_1$ monitors the second light beam is the same as a process in which the photosensitive array detector $D_2$ monitors the second light beam. For ease of description, the following uses the photosensitive array detector $D_1$ as an example for description. Two photosensitive array detectors are corresponding to two second light beams, namely, M is equal to 2. When an $i^{th}$ second light beam is transmitted to the photosensitive array detector $D_1$, light intensities that are of the $i^{th}$ second light beam and that are detected by the photosensitive units of the photosensitive array detector $D_1$ may be different, and a light intensity monitored by a photosensitive unit corresponding to a center of the second light beam is the greatest, where i ranges from 1 to M.

For example, at a first time point, the photosensitive array detector $D_1$ monitors the M second light beams to obtain first spatial intensity distribution information of the M second light beams. At a second time point, the photosensitive array detector $D_1$ monitors the M second light beams to obtain second spatial intensity distribution information of the M second light beams. Specifically, for the $i^{th}$ second light beam in the M second light beams, each photosensitive unit of the photosensitive array detector $D_1$ may monitor one first light intensity corresponding to the $i^{th}$ second light beam. The photosensitive array detector $D_1$ includes the 5*5 photosensitive units, and may obtain a 5*5 first light intensity array (as shown by I in FIG. 3d). A relationship between the 5*5 first light intensity array and a spatial location is first spatial intensity distribution information of the $i^{th}$ second light beam. The first spatial intensity distribution information of the $i^{th}$ second light beam may indicate a relationship, at the first time point, between a light intensity and a spatial location that are of the $i^{th}$ second light beam on the corresponding monitoring unit. At the second time point, based on a same process, each photosensitive unit of the photosensitive array detector $D_1$ may also monitor one second light intensity of the $i^{th}$ second light beam, and the photosensitive array detector $D_1$ may obtain a 5*5 second light intensity array. A relationship between the 5*5 second light intensity array and a spatial location is second spatial intensity distribution information of the $i^{th}$ second light beam.

In a possible implementation, the feedback module 131 is configured to: receive the first spatial intensity distribution information of the M second light beams and the second spatial intensity distribution information of the M second light beams, and determine the second shift information of the second light beam based on the first spatial intensity distribution information of the second light beam and the second spatial intensity distribution information of the second light beam to obtain the M pieces of second shift information.

Based on the foregoing case 1, the feedback module 131 is configured to receive M relationships (namely, the first spatial intensity distribution information) between the 5*5 first light intensity array and a spatial location, and M relationships (namely, the second spatial intensity distribution information) between the 5*5 second light intensity array and a spatial location. In a possible implementation, the feedback module 131 is configured to separately convert the M relationships between the 5*5 first light intensity array and a spatial location into one-dimensional light intensity distribution. Similarly, the M relationships between the 5*5 second light intensity array and a spatial location are also converted into the one-dimensional light intensity distribution. An example in which one relationship between the 5*5 first light intensity array and a spatial location in the M relationships between the 5*5 first light intensity array and a spatial location is converted into the one-dimensional light intensity distribution is used for description. For an X dimension, that a first average value of first light intensity of each column in the relationship between the 5*5 first light intensity array and a spatial position is determined may be as follows: Before the average value is calculated, the first light intensity of each column is accumulated, and based on the first average value of each column, a 1*5 first average value array (as shown in II of FIG. 3d) is obtained. It may also be understood that, in the X dimension, five groups of relationships between spatial locations and light intensities may be determined: $\{(x_1^{(i)}, I_1^{(i)}), (x_2^{(i)}, I_2^{(i)}), (x_3^{(i)}, I_3^{(i)}), (x_4^{(i)}, I_4^{(i)}), (x_5^{(i)}, I_5^{(i)})\}$. A central location $x_0^{(i)}$ of the $i^{th}$ second light beam in the X dimension may be obtained by performing function fitting on the five groups of relationships between spatial locations and light intensities that are determined in the X dimension and that are corresponding to the $i^{th}$ second light beam.

Optionally, a fitting function may be a Gaussian function shown in the formula, or may be a Cauchy-Lorentz distribution function.

$$I(x) = I_1 \exp\{-(x-x_0^{(1)})^2/2\sigma_x^2\} + \sigma_0 \quad \text{Formula 2}$$

x is a spatial location, and I(x) is a light intensity (namely, the first average value) at the spatial location x, namely, (x, I(x)) are corresponding to $\{(x_1^{(i)}, I_1^{(i)}), (x_2^{(i)}, I_2^{(i)}), (x_3^{(i)}, I_3^{(i)}), (x_4^{(i)}, I_4^{(i)}), (x_5^{(i)}, I_5^{(i)})\}$. $I_0$ is a background signal of the photosensitive array detector $D_1$. $I_1$ is a peak height of Gaussian distribution of an intensity of the second light beam detected by the photosensitive array detector $D_1$. $\sigma_x$ is a half-height full-width Gaussian distribution in the X dimension. $x_0^1$ is a central location of the $i^{th}$ second light beam that is obtained through fitting and that is in the X dimension of the photosensitive array detector $D_1$ at the first time point.

Based on a same process, in a Y dimension, five groups of relationships between spatial locations and light intensities may be determined: $\{(y_1^{(i)}, I_1^{(i)}), (y_2^{(i)}, I_2^{(i)}), (y_3^{(i)}, I_3^{(i)}), (y_4^{(i)}, I_4^{(i)}), (y_5^{(i)}, I_5^{(i)})\}$. For the five groups of relationships between the spatial locations and the light intensities that are corresponding to the $i^{th}$ second light beam: $\{(y_1^{(i)}, I_1^{(i)}), (y_2^{(i)}, I_2^{(i)}), (y_3^{(i)}, I_3^{(i)}), (y_4^{(i)}, I_4^{(i)}), (y_5^{(i)}, I_5^{(i)})\}$, a central location $y_0^{(1)}$ of the $i^{th}$ second light beam that is in the Y dimension of the photosensitive array detector $D_1$ at the first time point may be obtained by performing function fitting. In this way, it may be determined that coordinates of a central location of the $i^{th}$ second light beam that is on the photosensitive array detector $D_1$ at the first time point are $(x_0^{(1)}, y_0^{(1)})$.

Further, based on a same manner, it may be determined that coordinates of the central location of the $i^{th}$ second light beam that is on the photosensitive array detector $D_1$ at the second 2) time point are $(x_0^{(2)}, y_0^{(2)})$. It may be determined, according to the formula 3 and the formula 4, that second shift information of the $i^{th}$ second light beam on the photosensitive array detector $D_1$ is $\{\delta x_0^{(1)}, \delta y_0^{(1)}\}$.

$$\delta x_0^{(1)} = \int_{First\ time\ point}^{Second\ time\ point} (x_0^{(1)} - x_0^{(2)}) \quad \text{Formula 3}$$

$$\delta y_0^{(1)} = \int_{First\ time\ point}^{Second\ time\ point} (y_0^{(1)} - y_0^{(2)}) \quad \text{Formula 4}$$

Based on a same process, it may be determined that second shift information of a $j^{th}$ second light beam on the photosensitive array detector $D_2$ is $\delta x_0^{(2)}, \delta y_0^{(2)}$. The $j^{th}$ second light beam is another light beam of the two second light beams other than the $i^{th}$ second light beam.

In a possible implementation, the first time point may be a time point at which initialization performed on the ion trap system is completed. The second time point may be any time point after the first time point. A time interval between the first time point and the second time point may be determined based on an actual requirement. This is not limited in this application.

Figure 3E:
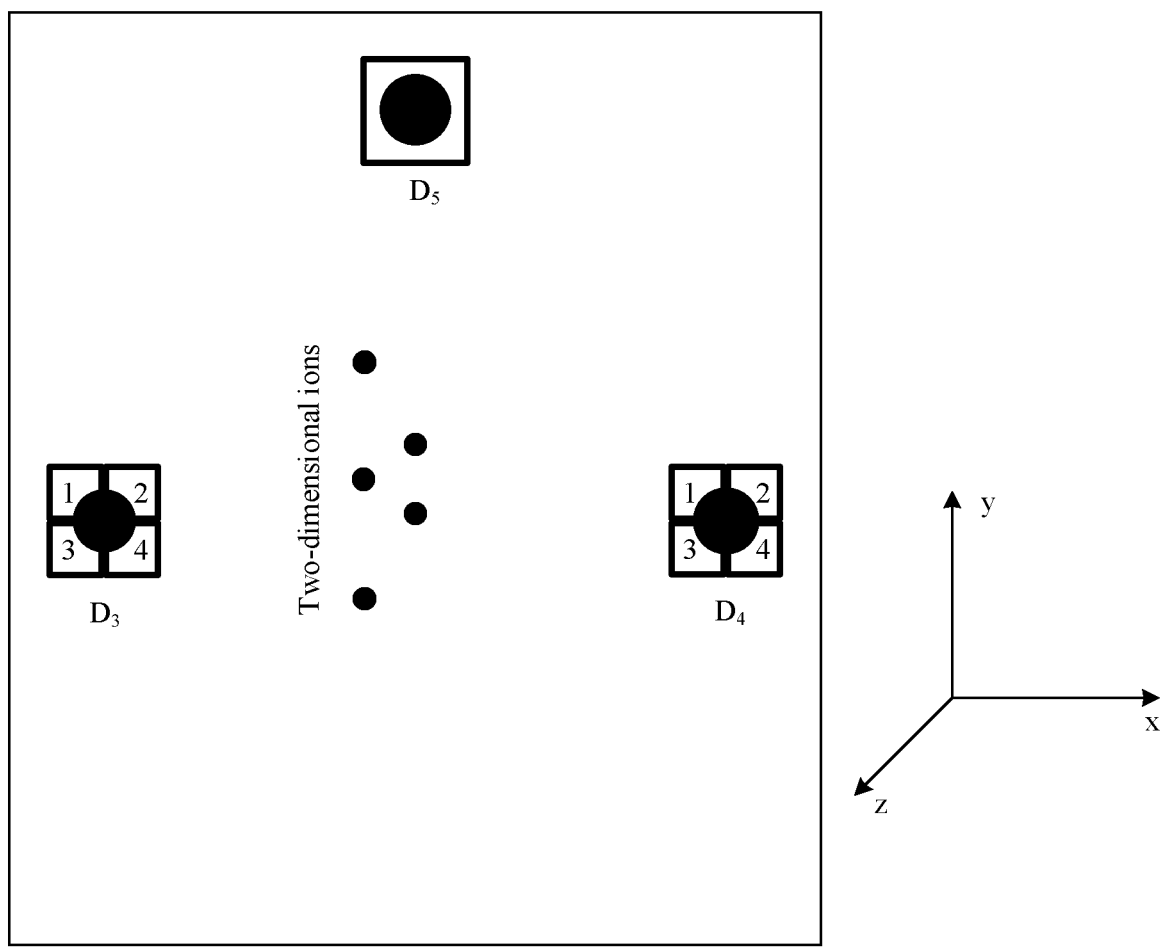
FIG. 3e is a schematic structural diagram of another ion trapping module according to this application.

Case 2: The two monitoring units 122 may be a quadrant photoelectric detector $D_3$ and a quadrant photoelectric detector $D_4$. FIG. 3e is a schematic structural diagram of an ion trapping module according to this application. The ion trapping module includes the quadrant photoelectric detector $D_3$ and the quadrant photoelectric detector $D_4$. Both the quadrant photoelectric detector $D_3$ and the quadrant photoelectric detector $D_4$ are photoelectric detectors formed by arranging four photodiodes with same performance based on a rectangular coordinate requirement. The quadrant photoelectric detector $D_3$ includes a quadrant 1, a quadrant 2, a quadrant 3, and a quadrant 4.

In the case 2, the quadrant photoelectric detector $D_3$ and the quadrant photoelectric detector $D_4$ may be a same photoelectric detector, and processes of monitoring the second light beam are the same. For ease of description, the quadrant photoelectric detector $D_3$ is used as an example for description below. When an $i^{th}$ second light beam is transmitted to the quadrant photoelectric detector $D_3$, magnitudes of photocurrents of the $i^{th}$ second light beam monitored in the quadrants may be different. A photocurrent monitored in a quadrant corresponding to a center of the $i^{th}$ second light beam is the largest, and a magnitude of the photocurrent may represent a magnitude of a light intensity, where i ranges from 1 to M.

For example, at a first time point, the quadrant photoelectric detector $D_3$ monitors the M second light beams to obtain first spatial intensity distribution information of the M second light beams. At a second time point, the quadrant photoelectric detector $D_3$ monitors the M second light beams to obtain second spatial intensity distribution information of the M second light beams. Specifically, at the first time point, for the $i^{th}$ second light beam in the M second light beams, each quadrant in the quadrant photoelectric detector $D_3$ can monitor a corresponding first photocurrent in the $i^{th}$ second light beam. The quadrant photoelectric detector $D_3$ includes four quadrants, and relationships between quadrants and the first photocurrent may be separately obtained: $\{(1,I_{1-1}^{(i)}), (2,I_{1-2}^{(i)}), (3,I_{1-3}^{(i)}), (4,I_{1-4}^{(i)})\}$. The relationships between the quadrants and the first photocurrent are the first spatial intensity distribution information. At a second time point, for the $i^{th}$ second light beam in the M second light beams, a corresponding second photocurrent in the $i^{th}$ second light beams can be monitored in each quadrant of the quadrant photoelectric detector $D_3$. The quadrant photoelectric detector $D_3$ includes the four quadrants, and relationships between quadrants and the second photocurrent may be obtained: $\{(1,I_{2-1}^{(i)}), (2,I_{2-2}^{(i)}), (3,I_{2-3}^{(i)}), (4,I_{2-4}^{(i)})\}$. The relationship between the quadrants and the second photocurrent is the second spatial intensity distribution information.

Based on the case 2, the feedback module 131 is configured to receive the relationships between the quadrants and the first photocurrent (the first spatial intensity distribution information) and the relationships between the quadrants and the second photocurrent (the second spatial intensity distribution information). In a possible implementation, the feedback module 131 may be configured to determine, according to the following formula 5, second shift information $\delta x_0^{(1)}$ of the $i^{th}$ second light beam that is in an X dimension of the quadrant photoelectric detector $D_3$. The feedback module 131 may be configured to determine, according to the following formula 6, second shift information $\delta y_0^{(1)}$ of the $i^{th}$ second light beam that is in a Y dimension of the quadrant photoelectric detector $D_3$. In this way, the second shift information of the $i^{th}$ second light beam on the quadrant photoelectric detector $D_3$ may be determined.

$$\delta x_0^{(1)} = \{[(I_{2-1}+I_{2-3})-(I_{2-2}+I_{2-4})]-[(I_{1-1}+I_{1-3})-(I_{1-2}+I_{1-4})]\} \quad \text{Formula 5}$$

$$\delta y_0^{(1)} = \{[(I_{2-1}+I_{2-2})-(I_{2-3}+I_{2-4})]-[(I_{1-1}+I_{1-2})-(I_{1-3}+I_{1-4})]\} \quad \text{Formula 5}$$

Based on a same process, it may be determined that second shift information of a $j^{th}$ second light beam on the photosensitive array detector $D_4$ is $\{\delta x_0^{(2)}, \delta y_0^{(2)}\}$. The $j^{th}$ second light beam is another light beam of the two second light beams other than the $i^{th}$ second light beam.

In some embodiments, a new optical device may further be introduced to determine the second shift information of the second light beam. A light spot illuminated by the second light beam is amplified, and the magnified second shift information of the second light beam is realized, to determine the second shift information of the second light beam.

Based on the case 1 or the case 2 of the monitoring unit 122, the feedback module 131 may obtain the M pieces of second shift information. In a possible implementation, the feedback module 131 is configured to: determine the first shift information of the N first light beams based on the M pieces of second shift information, determine a first feedback signal based on the first shift information of the first light beam to obtain N first feedback signals, and transmit the N first feedback signals to the control module 132. The first shift information is used to indicate a degree to which the corresponding first light beam shifts from an initialization position. In another possible implementation, the feedback module 131 is configured to transmit the M pieces of second shift information to the control module 132. To be specific, after the feedback module 131 obtains the M pieces of second shift information, for a subsequent process, refer to the implementation 1 and the implementation 2 of the feedback control module 13. Details are not described herein again.

Based on the foregoing content, with reference to a specific hardware structure, the following provides six specific implementations of the foregoing ion trap system, to further understand an implementation process of the foregoing trap well system.

Example 1

Figure 4A:
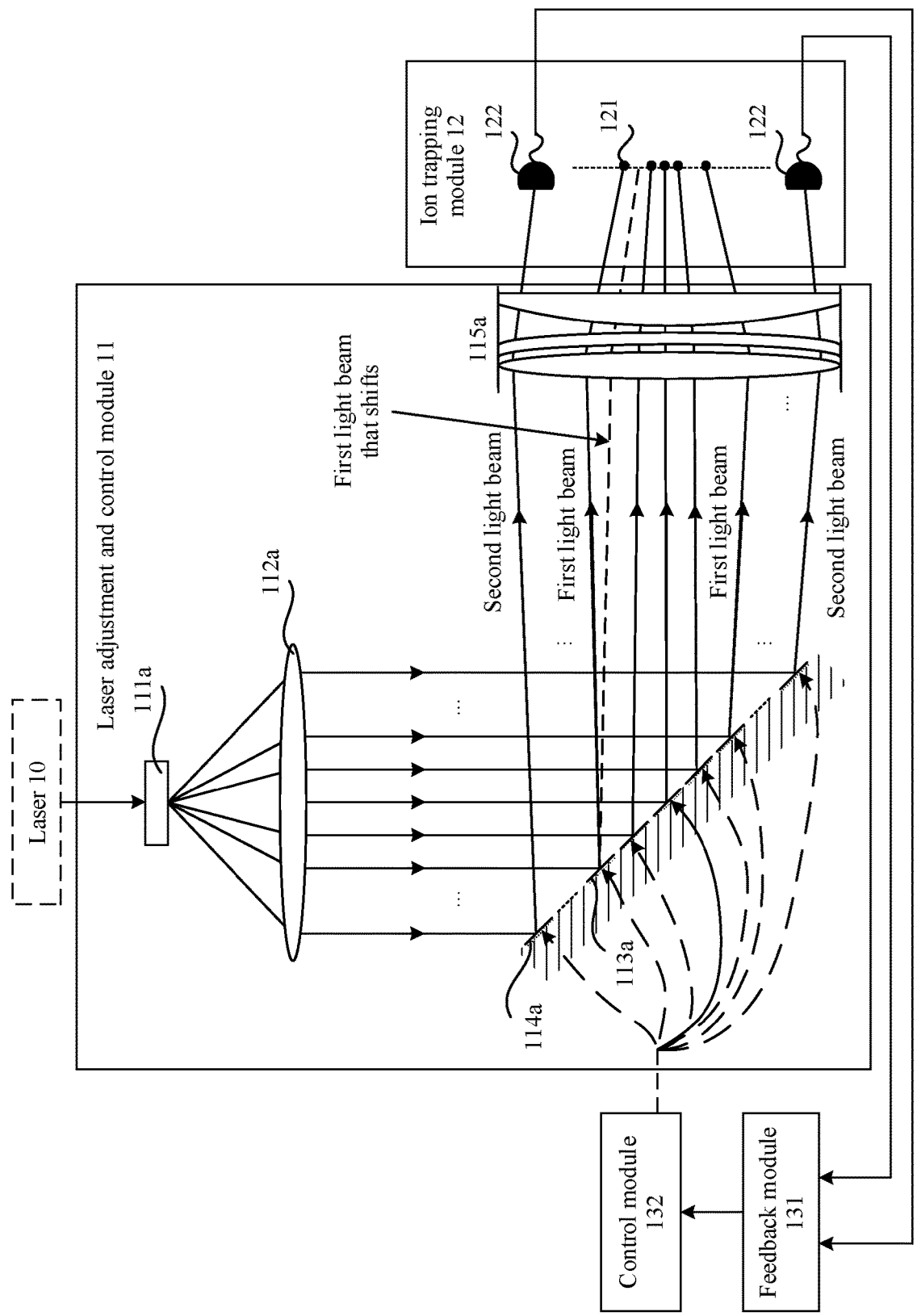
FIG. 4a is a schematic diagram of another architecture of an ion trap system according to this application.

FIG. 4a is a schematic diagram of another architecture of an ion trap system according to this application. As shown in FIG. 4a, the ion trap system includes a laser adjustment and control module 11, an ion trapping module 12, a feedback module 131, and a control module 132. The laser adjustment and control module 11 includes a first beamsplitter 111a, a lens 112a, N first MEMS reflection mirrors 113a, M second MEMS reflection mirrors 114a, and an objective lens 115a. N first light beams are in a one-to-one correspondence with the N first MEMS reflection mirrors 113a, and M second light beams are in a one-to-one correspondence with the M second MEMS reflection mirrors 114a. To be specific, one first MEMS reflection mirror 113a may change a transmission direction of one first light beam, and one second MEMS reflection mirror 114a may change a transmission direction of one second light beam.

The first beamsplitter 111a is configured to split a light beam from a laser into the N first light beams and the M second light beams. In a possible implementation, the first beamsplitter 111a may be further configured to split the light beam from the laser into P first light beams and Q second light beams. The N first light beams belong to N of the P first light beams, and the M second light beams belong to M of the Q second light beams. The first beamsplitter 111a may be a diffractive optical element (DOE) (as shown in FIG. 4a). The DOE may evenly split one light beam from the laser into the N first light beams and the M second light beams. Diameters and angles of divergence of the N emitted first light beams and the M emitted second light beams are the same as diameters and angles of divergence of a light beam emitted into the DOE, and there is only a change in a transmission direction. Namely, in this embodiment, the first light beam and the second light beam are a same beam. Optionally, a quantity of light beams split by the DOE and a spacing between the light beams may be determined by a physical structure of the DOE. It may also be understood that the physical structure of the DOE may be determined based on a spacing between the first light beams, a spacing between the second light beams, and a spacing between the first light beam and the second light beam. In another possible implementation, the first beamsplitter may alternatively be N+M polarization beam splitters (PBS). The N+M PBSs are in a one-to-one correspondence with the N first light beams and the M second light beams. It may also be understood that N PBSs in the N+M PBSs are in a one-to-one correspondence with the N first light beams, and M PBSs in the N+M PBSs are in a one-to-one correspondence with the M second light beams, where the N PBSs and the M PBSs do not overlap. It should be noted that the PBS may split an incident light beam into two polarized light beams that are perpendicular to each other in a polarization direction, namely, a P-polarized light beam and an S-polarized light beam. The P-polarized light beam passes through, and the S-polarized light beam is reflected at an angle of 45 degrees. The P-polarized light beam and an emergent direction of the S-polarized light beam form an angle of 90 degrees. Therefore, a split ratio of 1:1 to a split ratio of 1:(N+M) can be realized, that is, a light beam whose total light intensity is $I_0$ is divided into N+M light beams whose light intensities are all $I_0/(N+M+1)$.

The lens 112a is configured to: converge the N first light beams and the M second light beams that are from the first beamsplitter 111a into parallel light, transmit the N first light beams that are converged into the parallel light to the N first MEMS reflection mirrors 113a, respectively, and transmit the M second light beams that are converged into the parallel light to the M second MEMS reflection mirrors 114a, respectively.

The N first MEMS reflection mirrors 113a separately transmit the received first light beams to the objective lens 115a. The M second MEMS reflection mirrors 114a are configured to separately transmit the received second light beams to the objective lens 115a. To be specific, one first MEMS reflection mirror 113a may transmit one first light beam to the objective lens, and one second MEMS reflection mirror 114a may transmit one second light beam to the objective lens.

The first MEMS reflection mirror 113a and the second MEMS reflection mirror 114a may be the same or may be different. The N first MEMS reflection mirrors 113a and the M second MEMS reflection mirrors 114a may form an MEMS reflection mirror array.

In a possible implementation, if N ions 121 are in one-dimensional arrangement, namely, a one-dimensional ion chain is formed, the first MEMS reflection mirrors 113a are also in the one-dimensional arrangement, namely, the first MEMS reflection mirrors 113a are arranged on one line. If the N ions 121 are in two-dimensional arrangement, the first MEMS reflection mirrors 113a are also in the two-dimensional arrangement, that is, the first MEMS reflection mirrors 113a are arranged on one surface, and the first MEMS reflection mirror 113a may transmit one first light beam to one ion 121. If the N ions 121 are in three-dimensional arrangement, the first MEMS reflection mirrors 113a are also in the three-dimensional arrangement, and the first MEMS reflection mirror 113a may transmit one first light beam to one ion 121. Both the N first MEMS reflection mirrors 113a and the M second MEMS reflection mirrors 114a may be independently adjusted through a control signal input by the control module 132. The first MEMS reflection mirror 113a may independently change a transmission direction of the corresponding first light beam. The second MEMS reflection mirror 114a independently changes a transmission direction of the corresponding second light beam. In a possible implementation, the N first MEMS reflection mirrors 113a change transmission directions of the N first light beams under control of N first control signals. The M second MEMS reflection mirrors 114a change transmission directions of the M second light beams under control of M second control signals. To help a monitoring unit 122 monitor the second light beam, the M second MEMS reflection mirrors 114a are usually MEMS reflection mirrors at edges, and the corresponding M second light beams may also be light beams at edges.

It should be noted that controllable deflection angles of the first MEMS reflection mirror 113a and the second MEMS reflection mirror 114a are usually ±5°. Usually, a distance between the first MEMS reflection mirror 113a and the ion 121 is several centimeters, and a distance between the ions 121 is in microns. Therefore, the controllable deflection angles of the first MEMS reflection mirror 113a and the second MEMS reflection mirror 114a may meet an angle range that needs to be adjusted.

The objective lens 115a is configured to: focus the N first light beams from the N first MEMS reflection mirrors 113a and the M second light beams from the M second MEMS reflection mirrors 114a, transmit the focused N first light beams to the N ions 121, respectively, and transmit the focused M second light beams to M monitoring units 122, respectively. Namely, one first light beam is transmitted to one ion 121, and one second light beam is transmitted to one monitoring unit 122.

It should be noted that, to reduce impact on a surrounding quantum bit when the first light beam performs quantum state manipulation on the ion, a beam waist of the first light beam needs to be focused, at the ion, to a very small value (usually a micron magnitude). The objective lens 115a may be an objective lens with a relatively high numerical aperture. This kind of objective lenses may be combined by a plurality of lenses, and a numerical aperture may reach 0.2 or above.

The feedback module 131, the control module 132, and the ion trapping module 12 may all have structures the same as the feedback module 131, the control module 132, and the ion trapping module 12 shown in FIG. 2. Details are not described herein again. The ion trapping module 12 may also be any one of the ion trapping module in FIG. 3a, FIG. 3b, FIG. 3c, and FIG. 3e, and details are not described herein again.

In a possible implementation, a distance between the objective lens 115a and the ion trapping module 12 is usually relatively small, and the objective lens 115a and the ion trapping module 12 may be integrated together.

In a possible implementation, when the ion trap system shown in FIG. 4a is initialized, initialization spacial locations (mainly initialization angles) of the N first MEMS reflection mirrors 113a and initialization spacial locations (mainly initialization angles) of the M second MEMS reflection mirrors 114a need to be separately determined. A process of determining the initialization angles of the N first MEMS reflection mirrors 113a is the same as a process of determining the initialization angles of the M second MEMS reflection mirrors 114a. That an initialization angle of any first MEMS reflection mirror 113a in the N first MEMS reflection mirrors 113a is determined is used as an example for description. A specific process is as follows. After the first MEMS reflection mirror 113a is randomly placed at an angle, a transmission direction of a first light beam corresponding to the first MEMS reflection mirror 113a is changed by continuously adjusting the angle of the first MEMS reflection mirror 113a. Rabi oscillation scanning is performed on an ion corresponding to the first light beam, and a diagram of a relationship between the Rabi intensity shown in FIG. 1a and coordinates of the first light beam may be obtained. When a location of the first light beam is aligned with the corresponding ion, a measured Rabi intensity 12 is the largest. At this time point, the angle of the first MEMS reflection mirror 113a is determined as the initialization angle. It may also be understood that, after initialization performed on the ion trap system is completed, the N first MEMS reflection mirrors 113a in the ion trap system are at corresponding initialization angles. In this way, when the N first MEMS reflection mirrors 113a transmit the N first light beams to the N ions, the N first light beams can be aligned with the N ions in a one-to-one manner. Similarly, the M second MEMS reflection mirrors 114a are at corresponding initialization angles, and the M second light beams can be aligned with the M monitoring units 122 in the one-to-one manner.

It should be noted that a process of determining the initialization angles of the N first MEMS reflection mirrors 113a and the initialization angles of the M second MEMS reflection mirrors 114a may be performing iterative automatic calibration and adjustment through a software program.

Based on the ion trap system shown in FIG. 4a, after initialization performed on the ion trap system is completed, both the N first MEMS reflection mirrors 113a and the M second MEMS reflection mirrors 114a remain close to the corresponding initialization angles. Subtle adjustment is subsequently performed under action of the feedback module 131 and the control module 132, to implement that the N first light beams are aligned with the N ions in the one-to-one manner, and the M second light beams are aligned with the M monitoring units in the one-to-one manner. In addition, a plurality of ions can be controlled at the same time, and one first light beam is corresponding to one ion. There is no problem that the first light beam switches from one ion to another ion. Therefore, there is no problem that the first light beam sweeps another ion, namely, the ions do not affect each other. Further, the first light beam is used to perform the quantum state manipulation on the corresponding ion, and the second light beam is used to determine shift information of the first light beam and the second light beam. In this way, the N first light beams can be aligned with the N ions in the one-to-one manner without the quantum state manipulation performed by the first light beam on the ion being damaged.

After the initialization performed on the ion trap system is completed, the quantum state manipulation can be performed on an ion in an ion trap. When the quantum state manipulation is performed on the ion, the first light beam may not be aligned with the corresponding ion due to disturbance, for example, a change of temperature and/or humidity (for example, a first light beam that shifts and that is indicated by a dashed line in FIG. 4a), of an environment in which the ion trap system is located. Based on this case, the control module 132 is configured to: input the corresponding first control signal to the first MEMS reflection mirror 113a, to align the first light beam with the corresponding ion 121 by adjusting the angle of the first MEMS reflection mirror 113a; and input the corresponding second control signal to the second MEMS reflection mirror 114a, to align the second light beam with the corresponding monitoring unit 122 by adjusting the angle of the second MEMS reflection mirror 114a.

The following provides an implementation of determining, based on the ion trap system shown in FIG. 4a, a first compensation angle of the first MEMS reflection mirror 113a and a second compensation angle of the second MEMS reflection mirror 114a. The first compensation angle and the second compensation angle may also be understood as a variation between a current angle and an initialization angle.

In a possible implementation, first shift information may be first determined before the first compensation angle is determined. Based on the case 1 or the case 2, after the feedback module 131 determines the M pieces of second shift information, in a possible implementation, the feedback module 131 determines the N pieces of first shift information of the N first light beams based on the M pieces of second shift information. In another possible implementation, the feedback module 131 is configured to transmit the M pieces of second shift information to the control module 132. The control module 132 is configured to determine the N pieces of first shift information based on the M pieces of second shift information. The following process of determining the first shift information may be determined by the feedback module 131, or may be determined by the control module 132. For ease of description of the solution, for the M second light beams, the $i^{th}$ second light beam is still used as an example, where i ranges from 1 to M. For the N first light beams, a $k^{th}$ first light beam is used as an example, where k ranges from 1 to N.

For the M second light beams, it is assumed that an ABCD matrix of the $i^{th}$ second light beam transmitted to the corresponding second MEMS reflection mirror 114a is $$\begin{pmatrix} A^{(i)} & B^{(i)} \\ C^{(i)} & D^{(i)} \end{pmatrix}.$$

Second compensation angles $\{\delta\theta_2^{(i)}, \delta\phi_2^{(i)}\}$ of the second MEMS reflection mirror 114a corresponding to the $i^{th}$ second light beam may be determined according to the following formula 7 and formula 8.

$$\delta\theta_2^{(i)} = -\delta x_0^{(i)}/B^{(i)} \qquad \text{Formula 7}$$

$$\delta\phi_2^{(i)} = \delta y_0^{(i)}/B^{(i)} \qquad \text{Formula 7}$$

Based on a same process, after i ranges from 1 to M, a second compensation angle corresponding to each of the M second MEMS reflection mirrors 114a may be determined.

For the N first light beams, it is assumed that a shift generated when the $k^{th}$ first light beam is transmitted to the corresponding first MEMS reflection mirror 113a is $\{\Delta x_1^{(k)}, \Delta \theta_1^{(k)}\}$. According to an ABCD matrix equation, the following relationship exists:

$$\begin{pmatrix} x_0^{(k)} + \delta x_0^{(k)} \\ \theta_0^{(k)} + \delta \theta_0^{(k)} \end{pmatrix} = \begin{pmatrix} A^{(k)} & B^{(k)} \\ C^{(k)} & D^{(k)} \end{pmatrix} \begin{pmatrix} x_1^{(k)} + \Delta x_1^{(k)} \\ \theta_1^{(k)} + \Delta \theta_1^{(k)} \end{pmatrix} \quad \text{Formula 9}$$

$x_0^{(k)}$ is a central location (a known quantity) of the $k^{th}$ first light beam in an X dimension of a corresponding ion. $\delta x_0^{(k)}$ is first shift information (an unknown quantity) of the $k^{th}$ first light beam in the corresponding ion. $x_1^{(k)}$ is an initialization horizontal shift, $\theta_1^{(k)}$ is an initialization shift angle, and $$\begin{pmatrix} A^{(k)} & B^{(k)} \\ C^{(k)} & D^{(k)} \end{pmatrix}$$

is a known quantity.

For the N first light beams and the M second light beams, a plane perpendicular to a transmission direction of the N first light beams and the M second light beams is selected. A common shift between the N first light beams and the M second light beams in the plane is $\{\Delta x_1, \Delta \theta_1\}$. $\delta d_1^{(k)}$ is a distance of the $k^{th}$ first light beam transmitted from the plane to the first MEMS reflection mirror 113a, and an ABCD matrix from the plane to the first MEMS reflection mirror 113a is $$\begin{pmatrix} 1 & \delta d_1^{(k)} \\ 0 & 1 \end{pmatrix}$$

Therefore, the following relationship exists:

$$\begin{pmatrix} \Delta x_1^{(k)} \\ \Delta \theta_1^{(k)} \end{pmatrix} = \begin{pmatrix} 1 & \delta d_1^{(k)} \\ 0 & 1 \end{pmatrix} \begin{pmatrix} \Delta x_1 \\ \Delta \theta_1 \end{pmatrix} \quad \text{Formula 10}$$

The formula 10 is simplified to obtain: $\Delta x_1^{(k)} = \Delta x_1 + \Delta \theta_1 \delta d_1^{(k)}$, and $\Delta \theta_1^{(k)} = \Delta \theta_1$. This is substituted into the foregoing formula 9, to obtain the following formula 11.

$$\begin{pmatrix} x_0^{(k)} + \delta x_0^{(k)} \\ \theta_0^{(k)} + \delta \theta_0^{(k)} \end{pmatrix} = \begin{pmatrix} A^{(k)} & B^{(k)} \\ C^{(k)} & D^{(k)} \end{pmatrix} \begin{pmatrix} x_1^{(k)} + \Delta x_1 + \Delta \theta_1 \delta d_1^{(k)} \\ \theta_1^{(k)} + \Delta \theta_1 \end{pmatrix} \quad \text{Formula 11}$$

The formula 11 may be simplified to obtain the following formula 12.

$$x_0^{(k)} + \delta x_0^{(k)} = A^{(k)}(x_1^{(k)} + \Delta x_1 + \Delta \theta_1 \delta d_1^{(k)}) + B^{(k)}(\theta_1^{(k)} + \Delta \theta_1) \quad \text{Formula 12}$$

For the M second light beams, $x_0^{(k)}$, $\delta x_0^{(k)}$, $A^{(k)}$, $B^{(k)}$, $x_1^{(k)}$, $\theta_1^{(k)}$, and $\delta d_1^{(k)}$ are all known quantities, and $\Delta x_1$ and $\Delta \theta_1$ are unknown quantities. Two pieces of second shift information: $\{\delta x_0^{(1)}, \delta y_0^{(1)}\}$ and $\{\delta x_0^{(2)}, \delta y_0^{(2)}\}$, determined in the case 1 or the case 2 of the monitoring unit 122, are substituted into the formula 12, respectively, so that $\{\Delta x_1, \Delta \theta_1\}$ may be determined.

Further, for the N first light beams, the first shift information $\delta x_0^{(k)}$ of the $k^{th}$ first light beam may be determined by substituting $\{\Delta x_1, \Delta \theta_1\}$ into the formula 12. A first compensation angle $\delta \theta_1^{(k)}$ in an X dimension of the first MEMS reflection mirror 113a may be determined according to a formula 13 and the determined first shift information $\delta x_0^{(k)}$.

$$\delta \theta_1^{(k)} = -\delta x_0^{(k)}/B^{(k)} \quad \text{Formula 13}$$

Based on a same process, the first shift information $\delta y_0^{(k)}$ may be determined. A first compensation angle $\delta \phi_1^{(k)}$ in a Y dimension of the first MEMS reflection mirror 113a may be determined according to a formula 14 and the determined first shift information $\delta y_0^{(k)}$.

$$\delta \phi_1^{(k)} = -\delta y_0^{(k)}/B^{(k)} \quad \text{Formula 14}$$

Further, first compensation angles $\{\delta \theta_1^{(k)}, \delta \phi_1^{(k)}\}$ of the first MEMS reflection mirror 113a may be determined.

In a possible implementation, the feedback module 131 may determine, based on the foregoing process and the first shift information of the first light beam, the corresponding first compensation angle of the first MEMS reflection mirror 113a, namely, for the N first MEMS reflection mirrors 113a, N first compensation angles may be obtained. The feedback module 131 generates the N first feedback signals based on the N first compensation angles, respectively, and transmits the N first feedback signals to the control module 132. The N first compensation angles are in a one-to-one correspondence with the N first feedback signals. The control module 132 is configured to: determine the first control signal based on the first feedback signal, to obtain the N first control signals, and transmit the N first control signals to the corresponding first MEMS reflection mirrors 113a, respectively. The N first feedback signals are in a one-to-one correspondence with the N first control signals, and the N first control signals are in a one-to-one correspondence with the N first MEMS reflection mirrors. The control module 132 adjusts the angle of the first MEMS reflection mirror 113a based on the received first control signal, and changes the transmission direction of the corresponding first light beam. Therefore, when the first light beam is transmitted to the corresponding ion 121, the first light beam is aligned with the ion 121. In this way, the N first light beams can be aligned with the N ions 121 in the one-to-one manner.

Further, the feedback module 131 is further configured to determine, based on the second shift information of the second light beam, a second compensation angle of the corresponding second MEMS reflection mirror 114a, namely, for the N second MEMS reflection mirrors 114a, M second compensation angles may be obtained. The feedback module 131 generates M second feedback signals based on the M second compensation angles, respectively, and transmits the M second feedback signals to the control module 132. The M second compensation angles are in a one-to-one correspondence with the M second feedback signals. The control module 132 is configured to: determine the second control signal based on the second feedback signal, to obtain the M second control signals, and transmit the M second control signals to the corresponding second MEMS reflection mirrors 114a. The M second feedback signals are in a one-to-one correspondence with the M second control signals, and the M second control signals are in a one-to-one correspondence with the M second MEMS reflection mirrors 114a. The control module 132 is configured to: adjust an angle of the second MEMS reflection mirror 114a based on the received second control signal, and change a transmission direction of the second light beam. Therefore, the second light beam transmitted to the ion trapping module 12 is aligned with the corresponding monitoring unit 122. In this way, the M second light beams can be aligned with the M monitoring units in the one-to-one manner.

In this application, when a light intensity of the first light beam and a light intensity of the second light beam are changed due to environment impact, quantum manipulation performed on the ion is also affected. For example, the light intensity of the first light beam is relatively weak, and fluorescence generated by illuminating the ion by the first light beam is also relatively weak. In this case, when a quantum state of the ion is detected, collected fluorescence is also relatively weak, and a result of a quantum state detector may be inaccurate. To resolve impact of the light intensity on the quantum manipulation, the light intensity of the first light beam and the light intensity of the second light beam may be compensated, to output the first light beam and the second light beam whose light intensities are stable.

Example 2

Figure 4B:
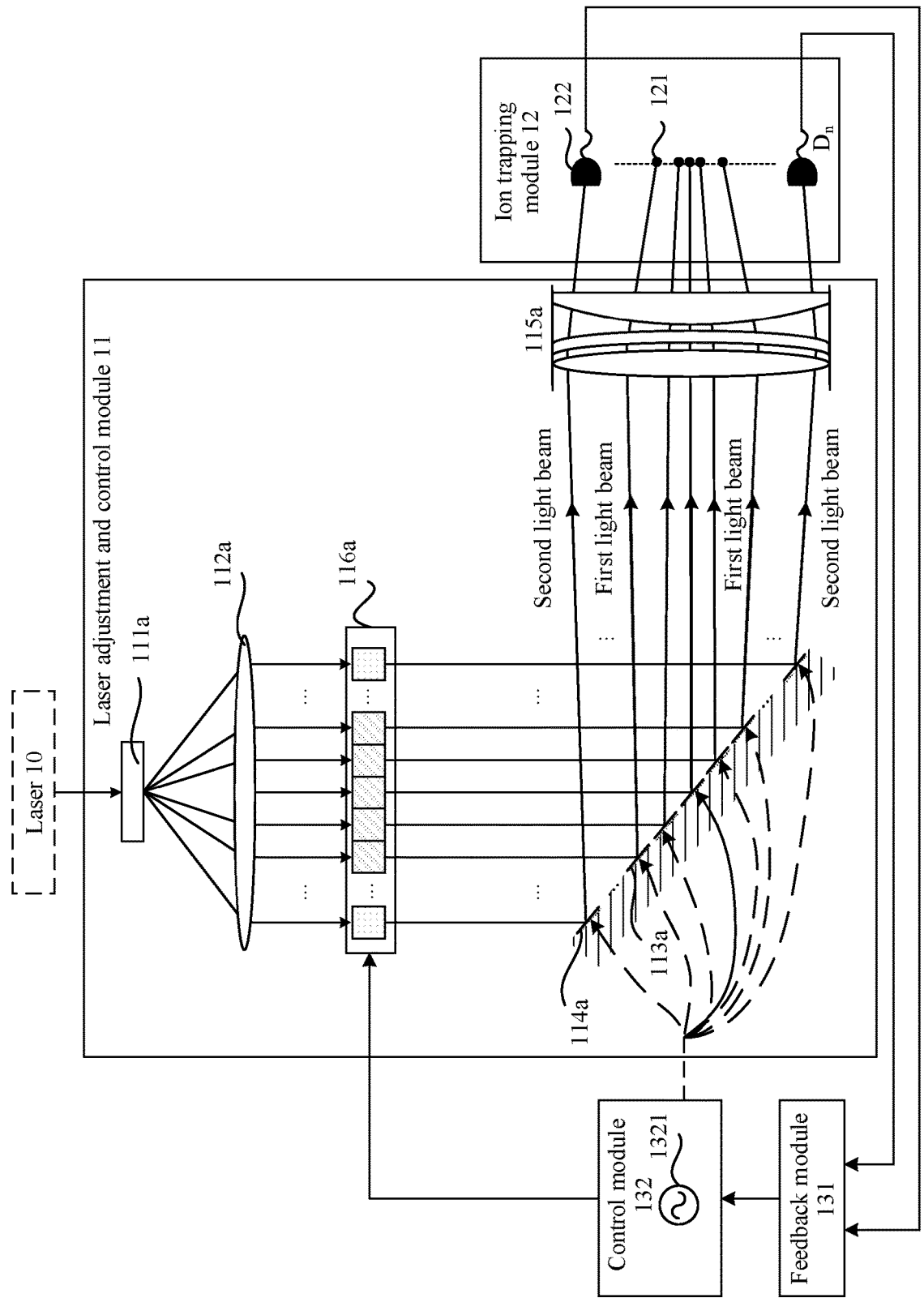
FIG. 4b is a schematic diagram of yet another architecture of an ion trap system according to this application.

FIG. 4b is a schematic diagram of yet another architecture of an ion trap system according to this application. The ion trap system includes a laser adjustment and control module 11, an ion trapping module 12, a feedback module 131, and a control module 132. The laser adjustment and control module 11 includes a first beamsplitter 111a, a lens 112a, N first micro-electro-mechanical system MEMS reflection mirrors 113a, M second MEMS reflection mirrors 114a, an objective lens 115a, and an AOM 116a. The control module 132 includes an RF source 1321. The AOM 116a includes N first channels and M second channels (which are filled with identifiers of different patterns as shown in FIG. 4b). The N first channels are in a one-to-one correspondence with N first light beams, and the M second channels are in a one-to-one correspondence with M second light beams. In addition, the N first channels and the M second channels do not overlap, and the N first channels and the M second channels are separately and independently adjusted and controlled.

The AOM 116a is configured to: modulate light intensities and/or light repetition frequencies of the N first light beams that pass through the first beamsplitters 111a and the lens 112a, and transmit the N first light beams to the N first MEMS reflection mirrors 113a, respectively, separately modulate light intensities and/or light repetition frequencies of the M second light beams that pass through the first beamsplitters 111a and the lens 112a, and transmit the M second light beams to the M second MEMS reflection mirrors 114a, respectively.

The RF source 1321 is configured to control a strength and a repetition frequency that are of a radio frequency signal input to the AOM 116a.

In a possible implementation, the AOM includes an acousto-optic medium and a piezoelectric transducer. When a wave frequency of a specific carrier of a driving source drives the transducer, the transducer generates an ultrasonic wave of a same frequency as the wave frequency, and transmits the ultrasonic wave to the acousto-optic medium. A refractive index changes in the medium. When a light beam passes through the medium, interaction occurs, and a transmission direction of the light beam changes, namely, diffraction occurs. Then, diffracted light may be emitted from the AOM.

In a possible implementation, when the first light beam passes through the first channel of the AOM 116a, under action of the RF source 1321, the first light beam is diffracted. Usually, the strength of the radio frequency signal of the RF source 1321 may be adjusted, so that an intensity of first-order diffractive light of the first light beam may be changed, that is, the intensity of the first-order diffractive light is proportional to the intensity of the radio frequency signal that is input into the AOM 116a by the RF source. A principle that the second light beam passes through the second channel of the AOM 116a is the same as a principle that the first light beam passes through the first channel of the AOM 116a. Details are not described herein again. For another structure in FIG. 4b, refer to the description in FIG. 4a. Details are not described herein again.

It may also be understood that a main difference between the embodiment shown in FIG. 4b and the embodiment shown in FIG. 4a is that in FIG. 4b, the AOM 116a and the RF source 1321 are added to an ion trap. The light intensities and the light repetition frequencies of the first light beam and the second light beam may be compensated through the AOM, to implement stable quantum state manipulation on an ion.

Figure 4C:
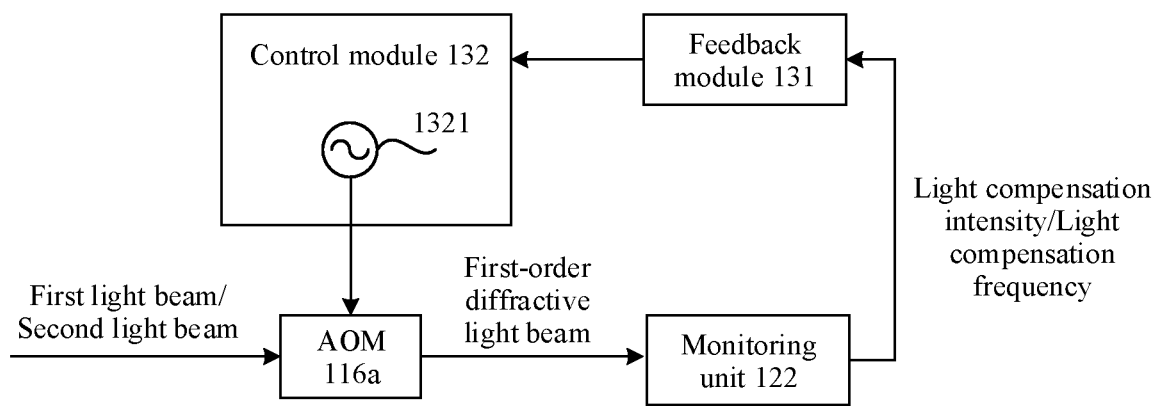
FIG. 4c is a schematic diagram of an architecture of light intensity modulation according to this application.

Based on FIG. 4b, this application provides an implementation of light intensity modulation. FIG. 4c is a schematic diagram of an architecture of light intensity modulation according to this application. In this architecture, the feedback module 131 is further configured to: determine a first total light intensity based on first spatial intensity distribution information of the M second light beams received from M monitoring units 122 to obtain M first total light intensities, and determine a second total light intensity based on second spatial intensity distribution information of the M second light beams received from the M monitoring units 122 to obtain M second total light intensities. The feedback module 131 is further configured to: determine a variation of the light intensity based on the M first total light intensities and the M second total light intensities, where the variation of the light intensity is light compensation intensities of the N first light beams and light compensation intensities of the M second light beams (namely, the light compensation intensity of the first light beam is the same as the light compensation intensity of the second light beam); and determine a third feedback signal based on the light compensation intensities, and transmit the third feedback signal to the control module 132. The control module 132 is further configured to: determine a third control signal based on the third feedback signal received from the feedback module 131, where the third control signal is used to control the strength of the radio frequency signal input to the AOM. In a possible implementation, the control module 132 includes the RF source 1321. The RF source 1321 may be configured to control, based on the third control signal, the strength of the radio frequency signal input to the AOM 116a. The M first total light intensities are in a one-to-one correspondence with M pieces of first spatial intensity distribution information, and the M second total light intensities are in a one-to-one correspondence with M pieces of second spatial intensity distribution information.

Further, to improve accuracy of the determined light compensation intensity, a sum of variations of light intensities monitored by the monitoring units 122 may be obtained, and then averaged. An obtained average value is used as the light compensation intensity.

For example, if two monitoring units 122 monitor a decrement of a light intensity of an $i^{th}$ second light beam and a decrement of a light intensity of a $j^{th}$ second light beam that are respectively $\Delta I_i$ and $\Delta I_j$. The feedback module 131 is configured to: determine that a total light intensity of the $i^{th}$ second light beam and the $j^{th}$ second light beam decreases by $\Delta I=(\Delta I_i+\Delta I_j)/2$ to determine that the light compensation intensities of the N first light beams and the light compensation intensities of the M second light beams are both+ΔI, determine the third feedback signal based on +ΔI, and transmit the third feedback signal to the control module 132. The control module 132 is configured to determine the third control signal based on the third feedback signal from the feedback module 131. The RF source 1321 in the control module 132 is configured to output, under control of the third control signal to the AOM 116a, a radio frequency signal whose strength is $P_{RF}$.

In a possible implementation, the repetition frequencies of the first light beam and the second light beam also affect the stable quantum state manipulation. Based on FIG. 4b, this application provides an implementation of repetition frequency modulation. As shown in FIG. 4c, the M monitoring units 122 are further configured to separately monitor the second light beam at a first time point and at a second time point, to obtain a first repetition frequency and a second repetition frequency of the second light beam. The feedback module 131 is further configured to: receive the first repetition frequency and the second repetition frequency, determine a variation of repetition frequencies based on the received first repetition frequency and the received second repetition frequency, where the variation of repetition frequencies is compensation repetition frequencies of the N first light beams and compensation repetition frequencies of the M second light beams; and determine a fourth feedback signal based on the compensation repetition frequencies, and transmit the fourth feedback signal to the control module 132. The control module 132 is further configured to: determine a fourth control signal based on the fourth feedback signal of the feedback module 131, where the fourth control signal is used to control a frequency of the radio frequency signal input to the AOM. In a possible implementation, the control module 132 includes the RF source 1321, and the RF source is further configured to control, based on the fourth control signal, the frequency of the radio frequency signal input to the AOM.

At the first time point, one second light beam is corresponding to one first repetition frequency, and M first repetition frequencies may be obtained. At the second time point, one second light beam is corresponding to one second repetition frequency, and M second repetition frequencies may be obtained. The M second light beams are in a one-to-one correspondence with the M first repetition frequencies, and the M second light beams are in a one-to-one correspondence with the M second repetition frequencies.

Further, to improve accuracy of the determined compensation repetition frequency, a sum of variations of the repetition frequencies of the second light beams monitored by the monitoring units 122 may be obtained, and then averaged. An obtained average value is used as the compensation repetition frequency.

In another possible implementation, the monitoring the second light beam to obtain a first repetition frequency and a second repetition frequency of the second light beam may be implemented by a high-speed PD $D_5$. As shown in FIG. 3e, the high-speed PD $D_5$, a quadrant photoelectric detector $D_3$, and a quadrant photoelectric detector $D_4$ may be on a xoy plane. If the first repetition frequency and the second repetition frequency of the second light beam are monitored by the high-speed PD $D_5$, at least three second light beams are required.

It should be noted that a response time period of the high-speed PD $D_5$ is within hundreds of picoseconds, and a high-order harmonic signal (reaching a GHz level) can be detected. In this way, the first repetition frequency and the second repetition frequency of the second light beam can be more sensitively monitored. The high-speed PD $D_5$ is not limited to being integrated into the ion trapping module 12, and may also be located at any location in an optical path. If an optical fiber is introduced into the optical path, the high-speed PD $D_5$ is usually placed after the optical fiber.

A principle that the AOM provided in this application can also implement repetition frequency compensation is as follows. A frequency of a first-order diffractive light beam emitted from the AOM is $f_1$. A value of the frequency is $f_1$, and is determined by the RF source. The frequency can be used to compensate a repetition frequency $f_{rep}$ of pulse laser light. Raman transition generated for two light beams: One light beam passes through an AOM whose modulation frequency is $f_1$, and the other light beam passes through an AOM whose modulation frequency is $f_0$. A following relationship is met, for example, a formula 15, where $f_0$ is a fixed value.

$$n \times f_{rep} + (f_0 - f_1) = \text{Constant} \qquad \text{Formula 15}$$

$f_1$ is a frequency of first-order diffractive light emitted from the AOM. When the repetition frequency $f_{rep}$ changes, $f_1$ may be adjusted to ensure the foregoing relationship. In this way, stability of the repetition frequency is implemented, and stable quantum manipulation may further be implemented.

Example 3

Figure 4D:
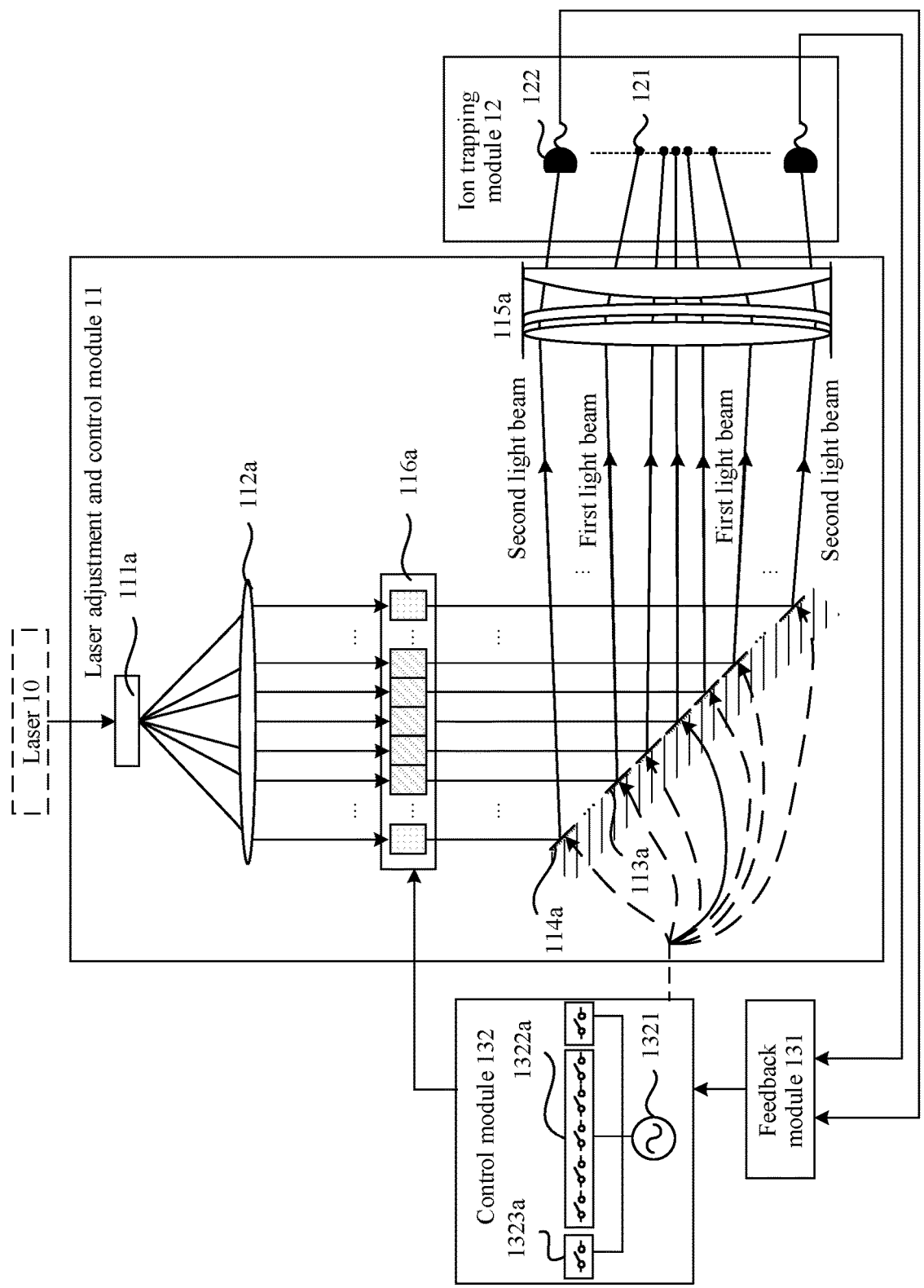
FIG. 4d is a schematic diagram of still another architecture of an ion trap system according to this application.

FIG. 4d is a schematic diagram of still another architecture of an ion trap system according to this application. The ion trap system may add a first switch 1322a and a second switch 1323a to the control module 132 in the ion trap system shown in FIG. 4b. The first switch 1322a is configured to control the N first channels of the AOM 116a, and the second switch 1323a is configured to control the M second channels of the AOM 116a. The N first channels and the M second channels may be separately and independently adjusted and controlled. The first switch 1322a is configured to control, based on a seventh control signal of the control module 132, a status of the first switch. The seventh control signal is determined by the control module 132 based on a time sequence of quantum state manipulation performed on N ions 121, and is presented as performing continuous switch switching in a time dimension. The second switch 1323a is configured to control, based on an eighth control signal of the control module 132, the second switch to remain in an open state. The eighth control signal is determined by the control module when determining that an ion trap is configured for the quantum state manipulation. In this way, that the second switch 1323a remains in the open state can implement real-time and continuous monitoring of second shift information, a variation of a light intensity, and/or a variation of repetition frequencies that are/is of a second light beam. This further facilitates alignment between a first light beam and a corresponding ion, and further improves stability of the quantum state manipulation.

In a possible implementation, the RF source 1321 in the control module 132 may control the first switch 1322a and the second switch 1323a. Then, the first switch 1322a controls the N first channels of the AOM 116a, and the second switch 1323a controls the M second channels of the AOM 116a. In another possible implementation, the RF source 1321 in the control module 132 may directly control a strength of a radio frequency signal input to the AOM 116a and/or a frequency of the radio frequency signal.

For example, both the first switch 1322a and the second switch 1323a may be fast optical switches. The first switch 1322a may be a switch group, including N first switches, and the N first switches are in a one-to-one correspondence with the N first channels. Alternatively, the first switch 1322a may be one first switch 1322a that controls the N first channels of the AOM 116a. The second switch 1323a may also be a switch group, including M second switches, and the M second switches are in a one-to-one correspondence with the M second channels. Alternatively, the second switch 1323a may be one second switch 1323a that controls the M second channels of the AOM 116a. In FIG. 4c, an example in which the first switch 1322a includes the N first switches and the second switch 1323a includes the M second switches is used for description.

Example 4

Figure 5A:
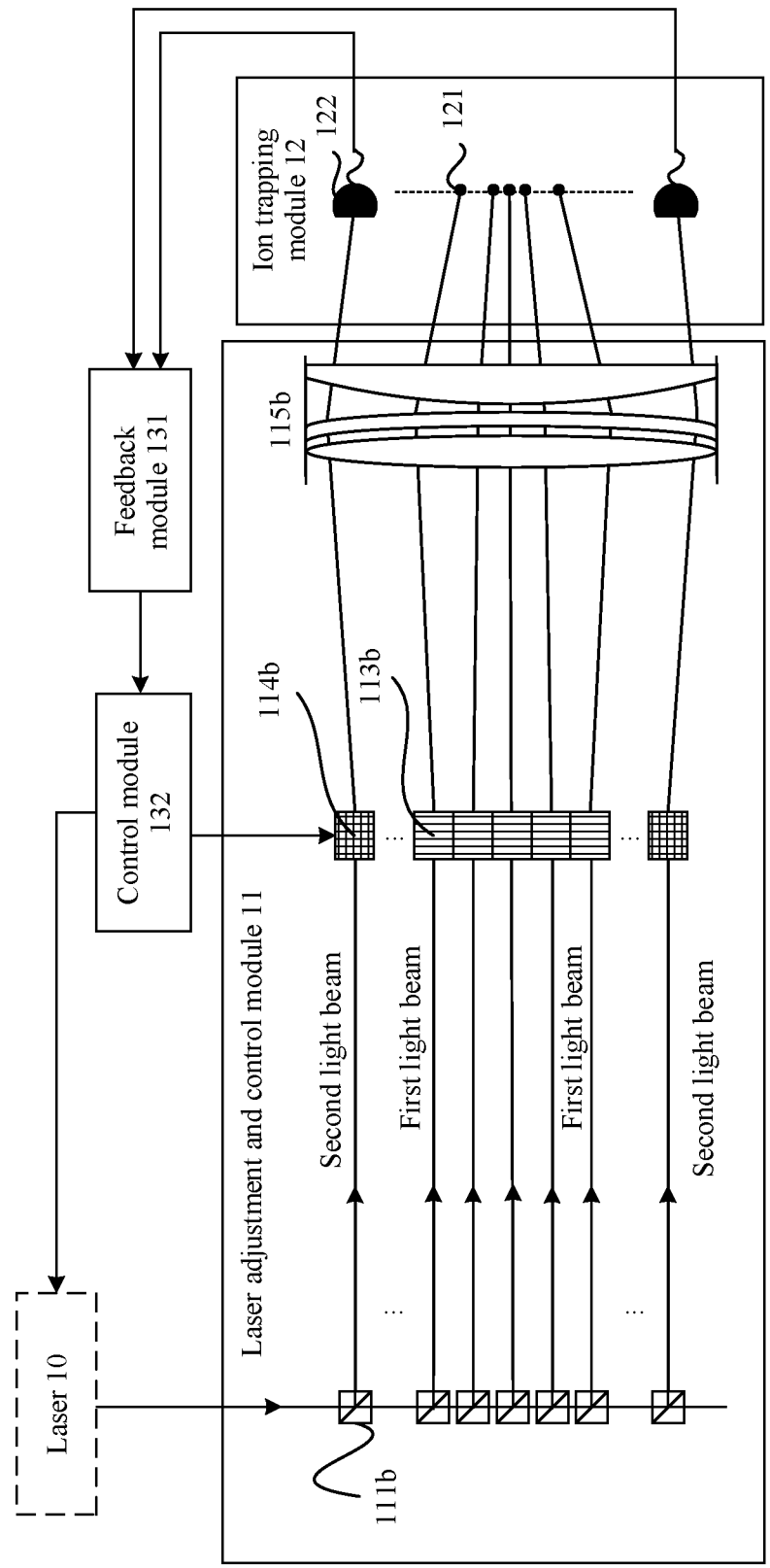
FIG. 5a is a schematic diagram of another architecture of an ion trap system according to this application.

FIG. 5a is a schematic diagram of another architecture of an ion trap system according to this application. As shown in FIG. 5a, the ion trap system includes a laser adjustment and control module 11, an ion trapping module 12, a feedback module 131, and a control module 132. The laser adjustment and control module 11 includes a second beamsplitter 111b, N first electro-optic deflectors EOD 113b, M second EODs 114b, and an objective lens 115b.

The second beamsplitter 111b is configured to split a light beam from a laser into N first light beams and M second light beams. Optionally, the second beamsplitter 111b may be the same as or different from the first beamsplitter 111a. In FIG. 5a, an example in which the first beamsplitter is N+M PBSs is used for description. The N+M PBSs are in a one-to-one correspondence with the N first light beams and the M second light beams. It may also be understood that N PBSs in the N+M PBSs are in a one-to-one correspondence with the N first light beams, M PBSs in the N+M PBSs are in a one-to-one correspondence with the M second light beams, and the N PBSs and the M PBSs do not overlap.

The N first EODs 113b are configured to separately transmit the received first light beams to the objective lens 115b, and the M second EODs 114b are configured to separately transmit the received second light beams to the objective lens 115b. The N first EODs 113b and the M second EODs 114b may be the same, and may form an array. Each of the N first EODs 113bs may independently adjust a transmission direction of a corresponding first light beam, and each of the M second EODs 114bs may independently adjust a transmission direction of a corresponding second light beam. It should be noted that EODs (including the N first EODs 113b and the M second EODs 114b) may change a transmission direction of a light beam within a specific range, and may control, with high precision, a deflection angle of the light beam. Specifically, a transmission direction of a corresponding light beam may be adjusted by adjusting and controlling a voltage loaded onto the first EOD 113b or the second EOD 114b.

The objective lens 115b is configured to: focus the N first light beams from the N first EODs 113b and the M second light beams from the M second EODs 114b, transmit the focused N first light beams to N ions 121, respectively, and transmit the focused M second light beams to M monitoring units 122 respectively.

In a possible implementation, after initialization performed on the ion trap system shown in FIG. 5a is completed, an initialization voltage of the first EOD 113b and an initialization voltage of the second EOD 114b may be determined. Under the initialization voltage, the first EOD 113b can align the N first light beams with the N ions 121 in a one-to-one manner. Under the initialization voltage, the second EOD 114b can align the M second light beams with the M second monitoring units 122 in the one-to-one manner.

After the initialization performed on the ion trap system is completed, quantum state manipulation can be performed on an ion in an ion trap. When the quantum state manipulation is performed on the ion, the first light beam may not be aligned with a corresponding ion due to disturbance, for example, a change of temperature and/or humidity, of an environment in which the ion trap system is located. Based on this case, the voltage of the first EOD 113b may be adjusted to implement alignment between the first light beam and the corresponding ion. The voltage of the second EOD 114b may be adjusted to implement alignment between the second light beam and a corresponding monitoring unit 122.

In a possible implementation, N pieces of first shift information may be determined based on the manner that is of determining the first shift information and that is provided in the implementation 1 and the implementation 2 of the feedback control module 13. In a possible implementation, the feedback module 131 is configured to: determine a corresponding first compensation voltage of the first EOD 113b based on first shift information of the first light beam to obtain N first compensation voltages, and generate N first feedback signals based on the N first compensation voltages. The N pieces of first shift information are in a one-to-one correspondence with the N first compensation voltages, and the N first compensation voltages are in a one-to-one correspondence with the N first feedback signals. The control module 132 is configured to: determine a first control signal based on the received first feedback signal to obtain N first control signals, and transmit the N first control signals to the corresponding first EODs 113b, respectively, where the N first control signals are in a one-to-one correspondence with the N first EODs 113b. The first EOD 113b is further configured to: adjust the voltage of the corresponding first EOD 113b based on the received first control signal, and change the transmission direction of the first light beam, to enable the first light beam transmitted to the ion trapping module 12 to be aligned with the corresponding ion 121. The second EOD 114b is further configured to: adjust the voltage of the second EOD 114b based on the received second control signal, and change the transmission direction of the second light beam, to enable the second light beams transmitted to the ion trapping module 12 to be aligned with the corresponding monitoring units 122 in the one-to-one manner. The M second control signals are in a one-to-one correspondence with the M second EODs 114b.

Example 5

Figure 5B:
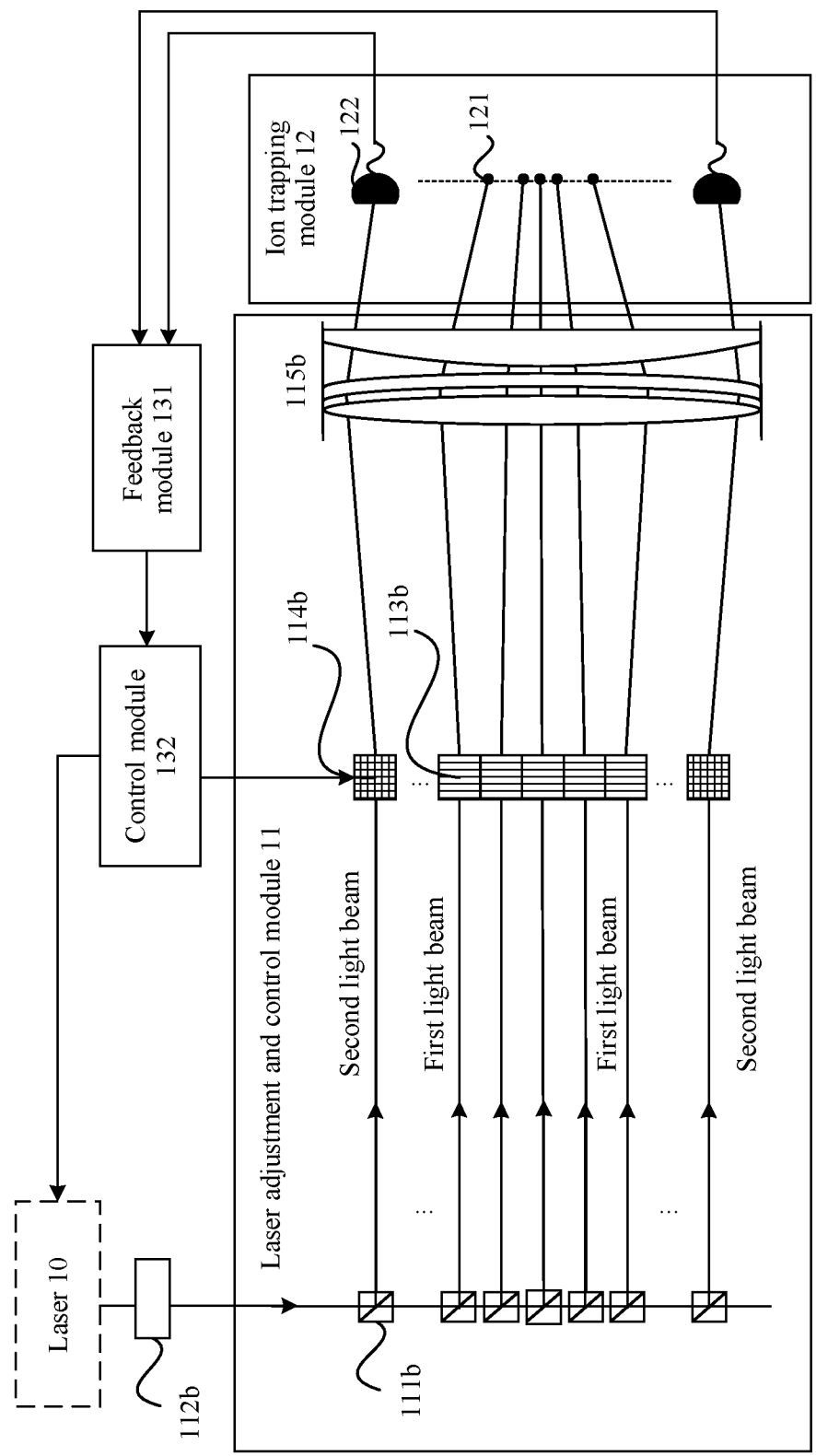
FIG. 5b is a schematic diagram of another architecture of an ion trap system according to this application.

This application provides another implementation of adjusting light intensities of a first light beam and a second light beam. FIG. 5b is a schematic diagram of another architecture of an ion trap system according to this application. The ion trap system includes the laser adjustment and control module 11, the ion trapping module 12, the feedback module 131, and the control module 132. The laser adjustment and control module 11 includes the second beamsplitter 111b, a half-wave plate 112b, the N first electro-optic deflectors EOD 113b, the M second EODs 114b, and the objective lens 115b. The half-wave plate 112b is disposed between the laser and the N+M second beamsplitters 111b, and is configured to: adjust a polarization direction of the light beam from the laser, and transmit the light beam whose polarization direction is adjusted to the second beamsplitter. It may also be understood that the half-wave plate 112b may rotate a polarization direction of a linearly polarized light beam. Therefore, the intensities of the first light beam and the second light beam that pass through the second beamsplitter may be determined by an angle of the half-wave plate 112b. The half-wave plate 112b may be an electrically controlled half-wave plate. In this embodiment, a difference from FIG. 5a is that the half-wave plate 112b is added based on FIG. 5a. For other structures, refer to the description in FIG. 5a. Details are not described herein again.

Figure 5C:
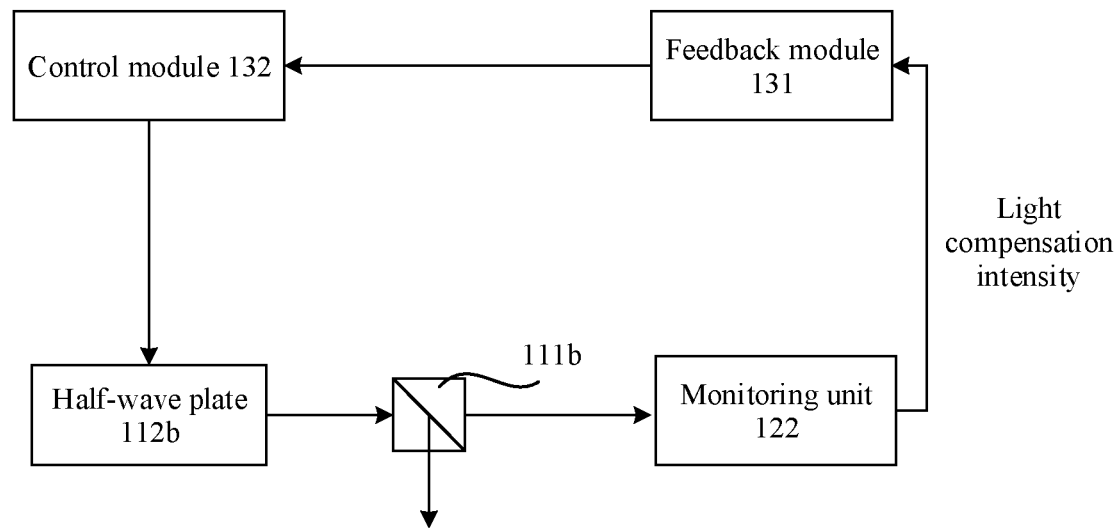
FIG. 5c is a schematic diagram of another architecture of light intensity modulation according to this application.

Based on FIG. 5b, this application provides another implementation of light intensity modulation. FIG. 5c is a schematic diagram of another architecture of light intensity modulation according to this application. The feedback module 131 is further configured to: determine a third total light intensity based on first spatial intensity distribution information of the M second light beams received from the M monitoring units 122 to obtain M third total light intensities; determine a fourth total light intensity based on second spatial intensity distribution information of the M second light beams received from the M monitoring units to obtain M fourth total light intensities; determine a variation of a light intensity based on the M third total light intensities and the M fourth total light intensities, where the variation of the light intensity is light compensation intensities of the N first light beams and light compensation intensities of the M second light beams; and determine a fifth feedback signal based on the variation of the light intensity, and transmit the fifth feedback signal to the control module 132. The control module 132 is further configured to: determine a fifth control signal based on the fifth feedback signal, and input the fifth control signal to the half-wave plate 112b, where the fifth control signal is used to adjust a polarization direction of the half-wave plate 112b. The M third total light intensities are in a one-to-one correspondence with M pieces of first spatial intensity distribution information, and the M fourth total light intensities are in a one-to-one correspondence with M pieces of second spatial intensity distribution information.

Example 6

Figure 5D:
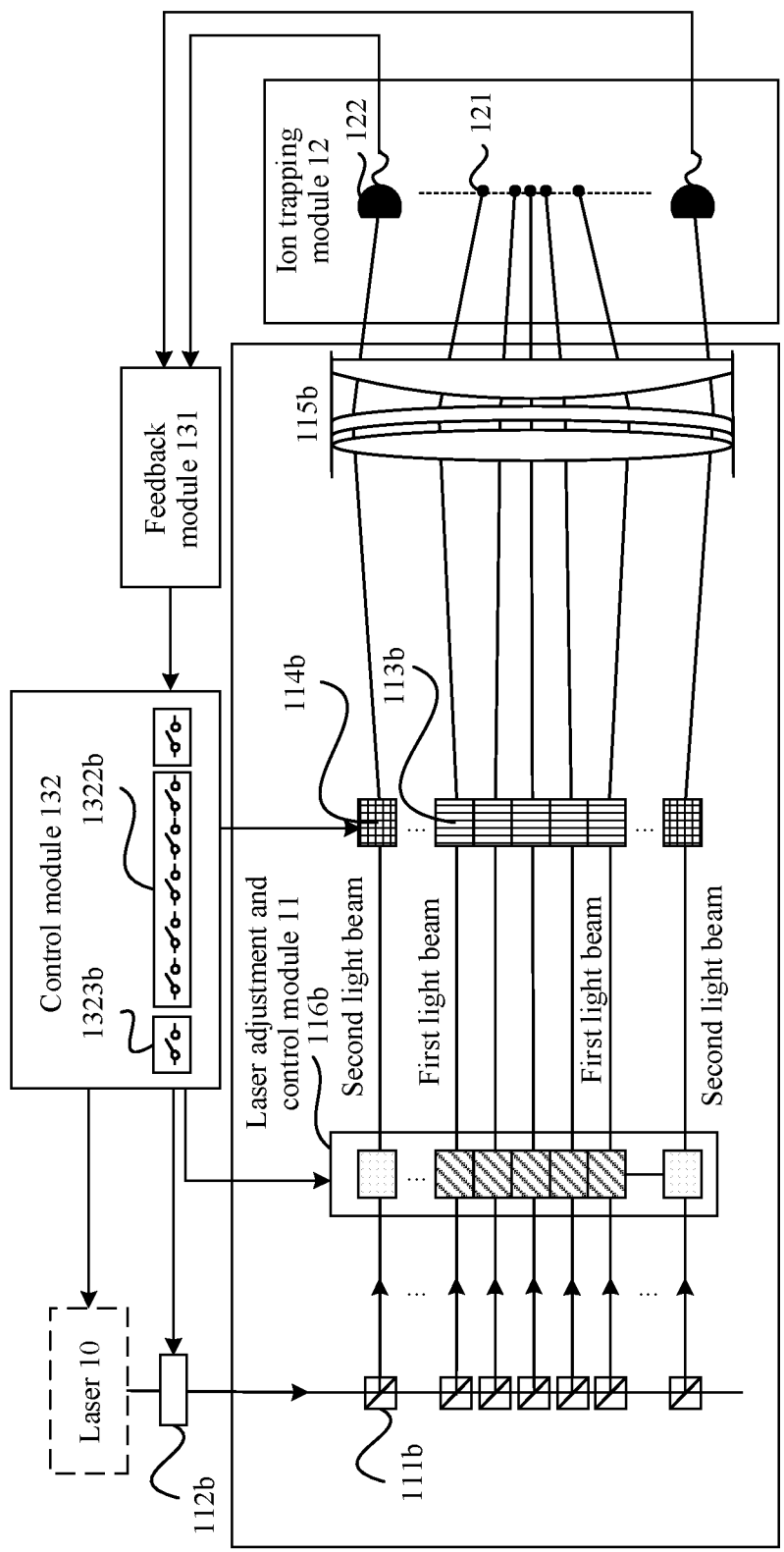
FIG. 5d is a schematic diagram of another architecture of an ion trap system according to this application.

FIG. 5d is a schematic diagram of another architecture of an ion trap system according to this application. As shown in FIG. 5d, an AOM 116b, a first switch 1322b, and a second switch 1323b may be added to the ion trap system shown in FIG. 5b. The AOM 116b may be the same as the AOM 116a in FIG. 4b, and details are not described herein again. In a possible implementation, the first switch 1322b may be the same as the first switch 1322a in FIG. 4d, and the second switch 1323b may be the same as the second switch 1323a in FIG. 4d. Details are not described herein again. The AOM 116b is configured to: transmit the N first light beams that pass through the second beamsplitters 111b to the N first EODs 113b, and transmit the M second light beams that pass through the second beamsplitters 111b to the M second EODs 114b. The first switch 1322b is corresponding to N first channels of the AOM 116b, and the second switch 1323b is corresponding to M second channels of the AOM 116b. The first switch 1322b is configured to control, based on a seventh control signal of the control module, a status of the first switch. The seventh control signal is determined by the control module based on a time sequence of quantum state manipulation performed on N ions The second switch 1323b is configured to control, based on an eighth control signal of the control module, the second switch 1323b to remain in an open state. The eighth control signal is determined by the control module 132 when determining that an ion trap is configured for the quantum state manipulation. The second switch remains in the open state. Therefore, the monitoring unit can continuously monitor second shift information, a light intensity, and/or a repetition frequency that are/is of the second light beam, and promptly adjust the transmission direction of the first light beam and the transmission direction of the second light beam, to further improve stability of the quantum state manipulation performed on the ion.

In a possible implementation, the RF source 1321 in the control module 132 may control the first switch 1322b and the second switch 1323b. Then, the first switch 1322b controls the N first channels of the AOM 116b, and the second switch 1323b controls the M second channels of the AOM 116b. In another possible implementation, the RF source 1321 in the control module 132 may directly control a strength of a radio frequency signal input to the AOM 116b and/or a frequency of the radio frequency signal.

In any foregoing embodiment, the PBS and/or the AOM may be made into a spliced structure, so that extension may be performed based on a quantity of ions 121.

In this application, the ion trap system may further include a laser. For any one of the foregoing six examples, the laser 10 may be further added to the ion trap system. The laser 10 may be a laser that outputs continuous laser light, or may be a laser that outputs pulse laser light. The ion trap system including the laser 10 may add the laser 10 to the ion trap system in any one of FIG. 4a, FIG. 4b, and FIG. 4d, or may add the laser 10 to the ion trap system in any one of FIG. 5b, FIG. 5b, and FIG. 5d.

It should be noted that modulation of the repetition frequency of the first light beam and the repetition frequency of the second light beam may also be implemented by adjusting a cavity length adjusting component 101 of the laser 10. It may also be understood that a repetition frequency of a light beam emitted by the laser may be determined by a cavity length of the laser. For example, for a piezoelectric ceramic on a cavity of a pulse laser, the piezoelectric ceramic may be configured to control a position of a reflection mirror in the cavity, to change the cavity length. The repetition frequency of the light beam output by the laser may be adjusted by changing the cavity length.

Figure 6:
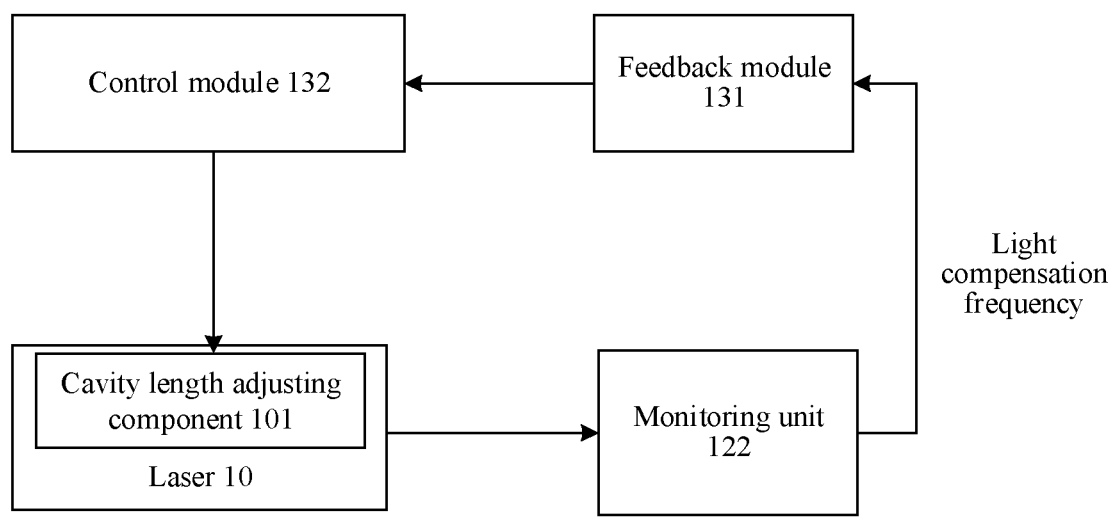
FIG. 6 is a schematic diagram of another architecture of an ion trap system according to this application.

Based on a case in which the ion trap system includes the laser 10, this application provides still another implementation of adjusting a repetition frequency of a first light beam and a repetition frequency of a second light beam. As shown in FIG. 6, the monitoring unit 122 is further configured to: monitor the M second light beams at a first time point to obtain a third repetition frequency of the second light beam, and monitor the M second light beams at a second time point to obtain a fourth repetition frequency of the second light beam. The feedback module 131 is further configured to: receive the third repetition frequency and the fourth repetition frequency, determine a variation of repetition frequencies based on the received third repetition frequency and the received fourth repetition frequency, where the variation of repetition frequencies is compensation repetition frequencies of the N first light beams and compensation repetition frequencies of the M second light beams; and determine a sixth feedback signal based on the compensation repetition frequencies, and transmit the sixth feedback signal to the control module 132. The control module 132 is further configured to: determine a sixth control signal based on the sixth feedback signal of the feedback module 131, and input the sixth control signal to the cavity length adjusting component 101 of the laser 10, where the sixth control signal is used to adjust the cavity length of the laser. In a possible implementation, the laser 10 includes the cavity length adjusting component 101, and the cavity length adjusting component 101 may be the piezoelectric ceramic or a stepper motor.

At the first time point, one second light beam is corresponding to one third repetition frequency, and M third repetition frequencies may be obtained. At the second time point, one second light beam is corresponding to one fourth repetition frequency, and M fourth repetition frequencies may be obtained. The M second light beams are in a one-to-one correspondence with the M third repetition frequencies, and the M second light beams are in a one-to-one correspondence with the M fourth repetition frequencies.

In this application, a plurality of optical devices in any one foregoing embodiment may be integrated into one device, or may be separately one device. That the plurality of optical devices are integrated into one device can save space and provide a possibility for implementing quantum manipulation performed on a large-scale ion trap system.

Although the present invention is described with reference to specific features and the embodiments thereof, obviously, various modifications and combinations may be made to them without departing from the spirit and scope of the present invention. Correspondingly, the specification and accompanying drawings are merely example description of the present invention defined by the accompanying claims, and is considered as any of or all modifications, variations, combinations or equivalents that cover the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. An ion trap system comprising:
   a laser adjustment and control module;
   an ion trapping module comprises M detectors disposed in a vacuum system; and
   a feedback control module;
   wherein the laser adjustment and control module is configured to:
   split an input light beam from a laser into P first light beams and Q second light beams, transmit N first light beams in the P first light beams to N ions in the ion trapping module respectively, and
   transmit M second light beams in the Q second light beams to the M detectors respectively, wherein the N first light beams are in a one-to-one correspondence with the N ions, the M second light beams are in a one-to-one correspondence with the M detectors, each first light beam is used to perform quantum state manipulation on a corresponding ion of the N ions, the M second light beams are used to determine second shift information, the second shift information is used to indicate a degree to which each of the M second light beams shifts from an initialization position;
   wherein the M detectors are configured to:
   monitor the M second light beams, and
   obtain spatial information of the M second light beams, respectively, wherein the spatial information corresponding to the M second light beams is used to indicate a spatial location of each second light beam on a corresponding detector in the M detectors, wherein the spatial information comprises spatial intensity distribution information of the M second light beams indicating a relationship between a light intensity and a spatial location of each of the M second light beams on a corresponding detector;
   wherein the feedback control module is configured to
   receive the spatial information of the M second light beams;
   determine N first control signals based on the spatial information of the M second light beams, and transmit the N first control signals to the laser adjustment and control module, wherein the N first control signals are in a one-to-one correspondence with the N first light beams, and the first control signals control the laser adjustment and control module to align each of the N first light beams with a corresponding ion;
   wherein the feedback control module comprises a feedback circuit and a controller; wherein the feedback circuit is configured to receive the spatial intensity distribution information of the M second light beams, determine the second shift information based on the spatial intensity distribution information of the M second light beams to obtain M pieces of second shift information, determine first shift information of the N first light beams based on the M pieces of second shift information, determine a first feedback signal based on the first shift information of the N first light beams to obtain N first feedback signals, and transmit the N first feedback signals to the controller, wherein the first shift information is used to indicate a degree to which each first light beam shifts from an initialization position; and wherein the controller is configured to determine the N first control signals based on the N first feedback signals, and transmit the N first control signals to the laser adjustment and controller.

2. The system according to claim 1 wherein the feedback circuit is further configured to:
   determine a second feedback signal based on the second shift information to obtain M second feedback signals, and transmit the M second feedback signals to the controller; and
   the controller is further configured to:
   determine a second control signal based on the second feedback signal to obtain M second control signals, and transmit the M second control signals to the laser adjustment and control module, wherein the M second control signals are in a one-to-one correspondence with the M second light beams, and the second control signal is used to control the laser adjustment and control module to align each of the M second light beam with a corresponding detector.

3. The system according to claim 2, wherein the M detectors are configured to:
   monitor the M second light beams at a first time point to obtain first spatial intensity distribution information of the M second light beams, and monitoring the M second light beams at a second time point to obtain second spatial intensity distribution information of the M second light beams;
   wherein the feedback circuit is configured to:
   receive the first spatial intensity distribution information of the M second light beams and the second spatial intensity distribution information of the M second light beams;
   determine the second shift information of the M second light beams based on the first spatial intensity distribution information of the M second light beams and the second spatial intensity distribution information of the M second light beams to obtain the M pieces of second shift information; and determine the first shift information of the N first light beams based on the M pieces of second shift information and a light beam transmission ABCD matrix between the laser adjustment and control module and the ion trapping module to obtain N pieces of first shift information.

4. An ion trap system comprising:
a laser adjustment and control module;
an ion trapping module comprises M detectors disposed in a vacuum system; and
a feedback control module;
wherein the laser adjustment and control module is configured to:
split an input light beam from a laser into P first light beams and Q second light beams, transmit N first light beams in the P first light beams to N ions in the ion trapping module respectively, and transmit M second light beams in the Q second light beams to the M detectors respectively, wherein the N first light beams are in a one-to-one correspondence with the N ions, the M second light beams are in a one-to-one correspondence with the M detectors, each first light beam is used to perform quantum state manipulation on a corresponding ion of the N ions, the M second light beams are used to determine second shift information, the second shift information is used to indicate a degree to which each of the M second light beams shifts from an initialization position;
wherein the M detectors are configured to:
monitor the M second light beams, and obtain spatial information of the M second light beams, respectively, wherein the spatial information corresponding to the M second light beams is used to indicate a spatial location of each M second light beam on a corresponding detector in the M detectors, wherein the spatial information comprises spatial intensity distribution information of the M second light beams indicating a relationship between a light intensity and a spatial location of each of the M second light beams on a corresponding detector;
wherein the feedback control module is configured to:
receive the spatial information of the M second light beams;
determine N first control signals based on the spatial information of the M second light beams, and transmit the N first control signals to the laser adjustment and control module, wherein the N first control signals are in a one-to-one correspondence with the N first light beams, and the first control signals control the laser adjustment and control module to align each of the N first light beams with a corresponding ion;
wherein the feedback control module comprises a feedback circuit and a controller, wherein the feedback circuit is configured to receive the spatial intensity distribution information of the M second light beams, determine the second shift information based on the spatial intensity distribution information of the M second light beams to obtain M pieces of second shift information, and transmit the M pieces of second shift information to the controller; and
wherein the controller is configured to determine first shift information of the N first light beams based on the M pieces of second shift information, determine the first control signals based on the first shift information of the N first light beams to obtain the N first control signals, and transmit the N first control signals to the laser adjustment and control module.

5. The system according to claim 4, wherein the controller is further configured to:
determine a second control signal based on the second shift information to obtain M second control signals, and transmit the M second control signals to the laser adjustment and control module, wherein the second control signal is used to control the laser adjustment and control module to align each of the M second light beams with a corresponding detector.

6. The system according to claim 5, wherein the M detectors are configured to:
monitor the M second light beams at a first time point to obtain first spatial intensity distribution information of the M second light beams, and monitoring the M second light beams at a second time point to obtain second spatial intensity distribution information of the M second light beams;
wherein the feedback circuit is configured to:
receive the first spatial intensity distribution information of the M second light beams and the second spatial intensity distribution information of the M second light beams; and
determine the second shift information of the M second light beams based on the first spatial intensity distribution information of the M second light beams and the second spatial intensity distribution information of the M second light beams to obtain the M pieces of second shift information, and transmitting the determined M pieces of second shift information to the controller; and
wherein the controller is configured to:
determine the first shift information of the N first light beams based on the M pieces of second shift information and a light beam transmission ABCD matrix between the laser adjustment and control module and the ion trapping module to obtain N pieces of first shift information.

7. The system according to claim 3, wherein the laser adjustment and control module comprises a first beamsplitter, a lens, N first micro-electro-mechanical system (MEMS) reflection mirrors, M second MEMS reflection mirrors, and an objective lens, the N first light beams are in a one-to-one correspondence with the N first MEMS reflection mirrors, and the M second light beams are in a one-to-one correspondence with the M second MEMS reflection mirrors;
wherein the first beamsplitter is configured to split the input light beam from the laser into the N first light beams and the M second light beams;
wherein the lens is configured to converge the N first light beams and the M second light beams from the first beamsplitter into parallel light, transmit the N first light beams that are converged into the parallel light to the N first MEMS reflection mirrors, respectively, and transmit the M second light beams that are converged into the parallel light to the M second MEMS reflection mirrors, respectively;
the N first MEMS reflection mirrors are configured to separately transmit the N first light beams to the objective lens, and the M second MEMS reflection mirrors are configured to separately transmit the M second light beams to the objective lens; and
the objective lens is configured to focus the N first light beams from the N first MEMS reflection mirrors and the M second light beams from the M second MEMS reflection mirrors, transmit the focused N first light beams to the N ions, respectively, and transmit the focused M second light beams to the M detectors, respectively.

8. The system according to claim 7, wherein the feedback circuit is configured to: determine, based on the first shift information of the N first light beams, to obtain N first compensation angles for the N first MEMS reflection mirrors, and generating the N first feedback signals based on the N first compensation angles, respectively, wherein the N first compensation angles are in a one-to-one correspondence with the N first feedback signals; wherein the controller is configured to: determine the first control signals based on the first feedback signal to obtain the N first control signals, and transmitting the N first control signals to the corresponding first MEMS reflection mirrors, respectively, wherein the N first control signals arc in a one-to-one correspondence with the N first MEMS reflection mirrors; wherein each first MEMS reflection mirror changes a reflection angle in response to receiving a corresponding first control signal to change a transmission direction of a corresponding N first light beam, to align the corresponding N first light beam with a corresponding ion, and wherein each second MEMS reflection mirror changes a reflection angle in response to receiving a corresponding second control signal to change a transmission direction of a corresponding M second light beam, to align the corresponding M second light beam with a corresponding detector.

9. The system according to claim 7, wherein the laser adjustment and control module further comprises an acoustic-optic modulator (AOM), the AOM comprises N first channels and M second channels, the N first channels are in a one-to-one correspondence with the N first light beams, the M second channels are in a one-to-one correspondence with the M second light beams, the N first channels and the M second channels are separately and independently adjusted and controlled; and wherein the AOM is configured to: modulate light intensities and/or light repetition frequencies of the N first light beams that pass through the first beamsplitters and the lens, and transmit the N first light beams to the N first MEMS reflection mirrors, respectively; and separately modulate light intensities and/or light repetition frequencies of the M second light beams that pass through the first beamsplitters and the lens, and transmit the M second light beams to the M second MEMS reflection mirrors, respectively.

10. The system according to claim 9, wherein the feedback circuit is further configured to:
determine a first total light intensity based on the first spatial intensity distribution information of the M second light beams received from the M detectors to obtain M first total light intensities, and determine a second total light intensity based on the second spatial intensity distribution information of the M second light beams received from the M detectors to obtain M second total light intensities;
determine a variation of the light intensity based on the M first total light intensities and the M second total light intensities, wherein the variation of the light intensity is light compensation intensities of the N first light beams and light compensation intensities of the M second light beams; and
determine a third feedback signal based on the variation of the light intensity, and transmit the third feedback signal to the controller; and wherein the controller is further configured to:
determine a third control signal based on the third feedback signal of the feedback circuit, wherein the third control signal is used to control a strength of a radio frequency signal input to the AOM.

11. The system according to claim 9, wherein the detector is further configured to
separately monitor the M second light beams at the first time point and the second time point to obtain a first repetition frequency and a second repetition frequency of the M second light beams;
wherein the feedback circuit is further configured to:
determine a variation of repetition frequencies based on the received first repetition frequency and the received second repetition frequency, wherein the variation of repetition frequencies is compensation repetition frequencies of the N first light beams and compensation repetition frequencies of the M second light beams; and
determine a fourth feedback signal based on the variation of repetition frequencies, and transmit the fourth feedback signal to the controller; and
wherein the controller is further configured to:
determine a fourth control signal based on the fourth feedback signal of the feedback circuit, wherein the fourth control signal is used to control a frequency of the radio frequency signal input to the AOM.

12. The system according to claim 3, wherein the laser adjustment and control module comprises a second beamsplitter, N first electro-optic deflectors (EOD), M second EODs, and an objective lens, the N first light beams are in a one-to-one correspondence with the N first EODs, and the M second light beams are in a one-to-one correspondence with the M second EODs,
wherein the second beamsplitter is configured to split the input light beam from the laser into the N first light beams and the M second light beams;
wherein the N first EODs are configured to separately transmit the N first light beams to the objective lens, and the M second EODs separately transmit the M second light beams to the objective lens; and
wherein the objective lens is configured to: focus the N first light beams from the N first EODs and the M second light beams from the M second EODs, transmit the focused N first light beams to the N ions, respectively, and transmit the focused M second light beams to the M detectors, respectively.

13. The system according to claim 12, wherein the feedback circuit is configured to: determine, by the feedback circuit based on the first shift information of the N first light beams, to obtain N first compensation voltages for the N first EODs, and generating the N first feedback signals based on the N first compensation voltages, respectively, wherein the N first compensation voltages are in a one-to-one correspondence with the N first feedback signals;
wherein the controller is configured to:
determine the first control signals based on the received first feedback signals to obtain the N first control signals, and transmitting the N first control signals to the corresponding first EODs, respectively, wherein the N first control signals are in a one-to-one correspondence with the N first EODs;
wherein each first EOD is configured to:
adjust a voltage of said each first EOD in response to receiving a corresponding first control signal, and change a transmission direction of a corresponding N first light beam, to align the corresponding N first light beam with a corresponding ion; and wherein each second EOD is configured to:
adjust a voltage of said each second EOD in response to receiving a corresponding second control signal, and change a transmission direction of a corresponding M second light beam, to align the corresponding M second light beam with a corresponding detector.

14. The system according to claim 13, wherein the laser adjustment and control module further comprises a half-wave plate;
wherein the half-wave plate is configured to: adjust a polarization direction of the input light beam from the laser, and transmit the input light beam whose polarization direction is adjusted to the second beamsplitter;
wherein the feedback circuit is further configured to:
determine M third total light intensities based on the first spatial intensity distribution information of the M second light beams received from the M detectors, determine M fourth total light intensities based on the second spatial intensity distribution information of the M second light beams received from the M detectors, determine a variation of a light intensity based on the M third total light intensities and the M fourth total light intensities, wherein the variation of the light intensity is light compensation intensities of the N first light beams and light compensation intensities of the M second light beams; and determine a fifth feedback signal based on the variation of the light intensity, and transmit the fifth feedback signal to the controller; and
wherein the controller is further configured to:
determine a fifth control signal based on the fifth feedback signal, and input the fifth control signal to the half-wave plate, wherein the fifth control signal is used to adjust a polarization direction of the half-wave plate.

15. The system according to claim 7, wherein the system further comprises a laser having a cavity length adjusting component;
wherein the detector is further configured to
separately monitor the M second light beams at the first time point and the second time point to obtain a third repetition frequency and a fourth repetition frequency of the M second light beams;
wherein the feedback circuit is further configured to:
determine the variation of repetition frequencies based on the third repetition frequency and the fourth repetition frequency, wherein the variation of repetition frequencies is the compensation repetition frequencies of the N first light beams and compensation repetition frequencies of the M second light beams; and
determine a sixth feedback signal based on the compensation repetition frequencies, and transmit the sixth feedback signal to the controller; and
wherein the controller is further configured to:
determine a sixth control signal based on the sixth feedback signal of the feedback circuit, and input the sixth control signal to the cavity length adjusting component of the laser to adjust a cavity length of the laser.

16. The system according to claim 12, wherein the laser adjustment and control module further comprises an acoustic-optic modulator (AOM), the AOM comprises N first channels and M second channels, the N first channels are in a one-to-one correspondence with the N first light beams, and the M second channels are in a one-to-one correspondence with the M second light beams; and
wherein the AOM is configured to transmit the N first light beams that pass through the second beamsplitters to the N first EODs, and transmit the M second light beams that pass through the second beamsplitters to the M second EODs.

17. The system according to claim 9, wherein the controller further comprises a first switch and a second switch, the first switch is corresponding to the N first channels of the AOM, and the second switch is corresponding to the M second channels of the AOM;
wherein the first switch is configured to control, based on a seventh control signal of the controller, a status of the first switch, wherein the seventh control signal is determined by the controller based on a time sequence of the quantum state manipulation performed on the N ions; and
wherein the second switch is configured to control, based on an eighth control signal of the controller, the second switch to remain in an open state, wherein the eighth control signal is determined by the controller when determining that the ion trap system is configured for the quantum state manipulation.

* * * * *